(12) United States Patent
Wismüller

(10) Patent No.: US 7,567,889 B2
(45) Date of Patent: Jul. 28, 2009

(54) METHOD, DATA PROCESSING DEVICE AND COMPUTER PROGRAM PRODUCT FOR PROCESSING DATA

(76) Inventor: Axel Wismüller, Stiftsbogen 35, 81375 Munich (DE)

( * ) Notice: Subject to any disclaimer, the term of this patent is extended or adjusted under 35 U.S.C. 154(b) by 439 days.

(21) Appl. No.: 10/524,551

(22) PCT Filed: Aug. 12, 2003

(86) PCT No.: PCT/EP03/08951

§ 371 (c)(1),
(2), (4) Date: Sep. 28, 2005

(87) PCT Pub. No.: WO2004/017258

PCT Pub. Date: Feb. 26, 2004

(65) Prior Publication Data

US 2006/0282236 A1 Dec. 14, 2006

(30) Foreign Application Priority Data

Aug. 14, 2002 (DE) ................................ 102 37 310

(51) Int. Cl.
*G06F 7/60* (2006.01)
*G06F 17/10* (2006.01)
(52) U.S. Cl. .......................................................... 703/2
(58) Field of Classification Search ...................... 703/2
See application file for complete search history.

(56) References Cited

FOREIGN PATENT DOCUMENTS

| EP | 0393571 A1 | 10/1990 |
|---|---|---|
| WO | 0116880 A2 | 3/2001 |

OTHER PUBLICATIONS

Tsuruta et al. "Hypercolumn Model: A Combination Model of Hierarchical Self-Organizing Maps and Neocognitron for Image Recognition." Systems and Computers in Japan, vol. 31, No. 2, 2000.*

Kunihiko Fukushima, "Neocognitron: A Self-organizing Neural Network Model for a Mechanism of Pattern Recognition Unaffected by Shift in Position", Biological Cybernetics 36. 193-202, Springer-Verlag, 1980.

(Continued)

*Primary Examiner*—Kamini Shah
*Assistant Examiner*—Saif Alhija
(74) *Attorney, Agent, or Firm*—Hooker & Habib, P.C.

(57) ABSTRACT

A method for data processing, to be run on a data processing device, for the mapping of input data to output data. Data objects are entered as input data and processed by a topology-preserving mapping. The method includes ordering of neurons in the ordering space according to a given pattern, assigning of codebook objects in the outcome space to the neurons processing of codebook objects according to the topology-preserving mapping by use of data objects of the exploration space, and output of the processed codebook objects as output data. At least a part of the entered data objects are used to determine the order of neurons in the ordering space, and/or are used as data objects of the exploration space.

12 Claims, 4 Drawing Sheets

OTHER PUBLICATIONS

Jouko Lampinen et al., "Clustering Properties of Hierarchical Self-Organizing Maps", Journal of Mathematical Imaging and Vision, vol. 2, pp. 261-272, 1992.

Naoyuki Tsuruta et al., "Hypercolumn Model: A Modified Model of Neocognitron Using Hierarchical Self-Organizing Maps", Lecture Notes in Computer Science vol. 1066, Proceedings of the International Work-Conference on Artificial and Natural Neural Networks: Foundations and Tools for Neural Modeling, ISBN 3-540-66069-0, pp. 840-849, 1999.

Sung and Poggio, "Example-based Learning for View-based Human Face Detection", Massachusetts Institute of Technology Artificial Intelligence Library, Dec. 1994.

* cited by examiner

METHOD, DATA PROCESSING DEVICE AND COMPUTER PROGRAM PRODUCT FOR PROCESSING DATA

The presented invention refers to a method for data processing for the mapping of raw input data onto output data, in particular for learning of topology-preserving mappings by self-organization with numerous applications to data processing and analysis. It further refers to processes for data processing. Finally, it refers to data processing devices and computer program products related to such methods.

BACKGROUND OF THE INVENTION

1 Basic Definitions

Although the concepts used here are independent of any specific model conception, it is useful for the understanding of the present invention to lead their description by basic definitions from the field of neural informatics. By this way, clear interpretations regarding the dynamic of learning in neural networks can frequently be established.

1.1 Vector Quantization

If a data set $X=\{x\}$, where $x \in \Re^n$, is to be characterized by a set C of so called codebook vectors $w_j$, $C=\{w_j \in \Re^n | j \in \{1, \ldots, N\}\}$, this problem is called vector quantization (VQ). Hereby, the codebook C should represent the statistical structure of a data set X, with a probability density of $$f: \Re^n \mapsto [0, 1], \quad x \mapsto f(x)$$

in a suitable way, whereby "suitable" can be defined in different ways regarding specific objectives. Typically, the number N of codebook vectors will be substantially smaller than the number #C of data points.

VQ methods are also often referred to as Clustering processes. Both terms will be used as synonyms in the following.

In VQ, one discerns between a so-called hard clustering, where each data point x is assigned to exactly one codebook vector $w_j$, and a so-called fuzzy clustering, where a data point x can be mapped, in a suitable way, to several codebook vectors $w_j$.

FIG. 1 shows schematically a neural net 10 as a model of a vector quantizer. It is composed of two layers: an input layer 12 and an output layer 14. Based on n input cells 16 with the activities $x_i$, $i \in \{1, \ldots, n\}$, the activity pattern in the input layer represents a data point x in the so-called feature space $\Re^n$. Through directional connections 18 that are weighted with the weights $w_{ji}$, this activity is passed onto the N cells 20 of the output layer. These cells of the output layer correspond to the codebook neurons. The connection weights—i.e. in the neural context the strength of the synapses—$w_j \in \Re^n$, $j \in \{1, \ldots, N\}$ are hereby chosen so that the activity $a_j$ of a neuron j on the output layer depends, in a suitable way, on the distance $d=\|x-w_j\|$ of the data point x from the virtual position $w_j$ of the codebook neuron j. d hereby defines any distance measure in the feature space. The term "virtual position" is hereby based on the idea that the activity $a_j$ of the codebook neuron should amount to its maximum value for $x_{max} \stackrel{!}{=} w_j$, which can be interpreted as a "specialization" of the neuron j to the position $x_{max}$.

After the training of the vector quantizer has been completed, an input signal x can be represented by the activations $a_j(x)$ of the codebook neurons j, whereby the connection weights of the codebook neuron j to the input layer can be combined to form the codebook vector $w_j$.

Some VQ algorithms can be generally characterized as iterative, sequential learning processes. Hereby, initially, the number N of codebook vectors $w_j$ is determined, and these are initialized. In the following, typically, a data point $x \in X$ will be randomly chosen and the codebook vectors will be repeatedly updated according to the general, sequential VQ learning rule $$w_j(t+1) = w_j(t) + \epsilon(t))(t,x,C)(x(t) - w_j(t)). \quad (1)$$

t describes the updating step, $\epsilon$ a freely chosen learning parameter, and $\Psi$, the so-called cooperativity function. Typically, the learning parameter $\epsilon$ is chosen monotonically decreasing for consecutive update steps. Due to analogies to systems of the statistical physics, this is often called "cooling". Frequently, an exponential cooling strategy is used:

$$\epsilon(t) = \epsilon(0) \left( \frac{\epsilon(t_{max})}{\epsilon(0)} \right)^{\frac{t}{t_{max}}}, \quad t \in [0, t_{max}]. \quad (2)$$

Besides the specifically chosen heuristics for the determination of the time dependence of $\epsilon$ and $\Psi$, numerous VQ methods essentially differ in the definition of the cooperativity function $\Psi$. Hereby, $\Psi$ selects, in each learning step, one and only one codebook vector $w_j$ to be updated, according to $$\Psi(t,x,C) := \delta_{i(x),j}, \quad (3)$$

whereby i(x) is defined out of the minimum distance $$\|x - w_i\| = \min_j \|x - w_j\|,$$

and $\delta$ denotes the Kronecker's delta. Because one and only one codebook vector participates in each learning step, this is also called a winner-takes-all learning rule. If otherwise $\Psi$ is chosen in a way that, in each learning step, several codebook vectors take part in the update, then equation (1) defines a winner-takes-most learning rule. Depending on the definition of $\Psi$, different methods for a so called fuzzy clustering result from this.

1.2 Self-Organizing Maps

A classical method of neural network computation is the Self-Organizing Map Algorithm (SOM) described by T. Kohonen. Seen in relation to the notes above, this algorithm can be interpreted as a VQ method as well.

Hereby, the choice of the reference space of the metric, on which the cooperativity function $\Psi$ in equation (1) is based, is of essential importance. In the self-organizing map algorithm, as well as in other topology-preserving mappings, the metric of the cooperativity function $\Psi$ refers to a target space that is independent of the source space.

The terms source space and target space are to be seen in relation to the mapping $$j: \Re^n \to \mathbb{R}^N, \quad x \mapsto a_j(x) \quad (4)$$

of the data points to the activations of the codebook neurons with the specifications of FIG. 1: The source space is generally identical to the feature space as defined above, e.g. to $\Re^n$. In self-organizing maps, the target space can be interpreted for instance as a space of the physical positions $r_j$ of the codebook neurons j, according to a mapping $$r: \mathbb{N} \to \mathbb{R}^k, \quad j \mapsto r(j). \quad (5)$$

For the scientific discovery of the self-organizing map algorithm, the interpretation in connection to neurophysiological model concepts was essential. For this reason, the target space, i.e. the space of the $r_j:=r(j)$ is often referred to as model cortex. A typical case is, for instance, the ordering of N codebook neurons on a two dimensional discrete periodical grid (i.e. k=2), in form of a sensorial map, which should represent the input from n sensory cells. To this, there are numerous biological examples, e.g. the retinotopic projection of fishes and amphibians. Here, Kohonen found a heuristics, "where the neurons j of the model cortex coordinate their sensitivity to input signals x, in a way that their response behavior to signal characteristics varies, in a regular way, along with their position on the model cortex".

Here, the physical position r of the codebook neurons determines the metric of the cooperativity function $\Psi$. In contrast to this issue, its concrete choice as a Gaussian function $$\psi(r, r'(x(t)), \sigma(t)) := \exp\left(-\frac{(r - r'(x(t)))^2}{2\sigma(t)^2}\right) \quad (6)$$

or e.g., as a characteristic function on a k-dimensional hypersphere around $r'(x(t))$ $$\psi(r, r'(x(t)), \sigma(t)) := \chi_{\|r-r'(x(t))\| \leq \sigma(t)} := \begin{cases} 1 : \|r - r'(x(t))\| \leq \sigma(t) \\ 0 : \|r - r'(x(t))\| > \sigma(t) \end{cases} \quad (7)$$

is, in contrast, of minor importance. In this context, according to $$\|x - w_{r'}\| = \min\|x - w_r\|, \quad (8)$$

$r'(x(t))$ defines, for a given stimulus $x(t) \in \mathfrak{R}^n$ the neuron with the highest activity, the so called "winner neuron". For characterizing a codebook neuron, its physical position, according to (5), is used directly. Thus, the learning rule (1) becomes $$w_r(t+1) = w_r(t) + \epsilon(t)\Psi(r; r'(x(t)), \sigma((t))(x(t) - w_r(t)). \quad (9)$$

Here, $\sigma(t)$ denotes the corresponding cooperativity parameters from equation (6) and (7), respectively. It is a measure of the "stretch" of the neighborhood function $\Psi$ in the model cortex and is, just like the learning parameter $\epsilon(t)$, usually modified during the learning process, according to a suitable heuristics, e.g. similarly to equation (2):

$$\sigma(t) = \sigma(0)\left(\frac{\sigma(t_{max})}{\sigma(0)}\right)^{\frac{t}{t_{max}}} \quad t \in [0, t_{max}]. \quad (10)$$

From these definitions, the training of a self-organizing map, can be described as a technical procedure as follows:
(i) Initialization: Choose suitable initial values for the codebook vectors $w_j$. In lack of any a-priori information, the $w_j$ can, e.g., be randomly chosen.
(ii) Stimulus Choice: Randomly choose a vector x among the entered data in the feature space.
(iii) Response: Determine the winner neuron according to equation (8).
(iv) Adaptation Step: Perform an adaptation step by modifying the codebook vectors according to equation (9).
(v) Iteration: Repeat steps (ii)-(iv), until a suitable stop criterion is fulfilled.

1.3 General View on Topology-Preserving Mappings

The terms essential for the understanding of the invention are described in the following.

The starting point is the data processing by use of so-called "topology-preserving mappings". It refers to different, state-of-the-art data processing methods. Important examples are: Self-Organizing Map (SOM) (as described in section 1.2), Generative Topographic Mapping (GTM), Neural Gas Algorithm, different forms of topographic vector quantizers (e.g. Topographic Vector Quantizer (TVQ), Soft Topographic Vector Quantizer (STVQ), Soft Self-Organizing Map (SSOM), Kernel-Based Soft Topographic Mapping (STMK), Soft Topographic Mapping of Proximity Data (STMP)), as well as numerous variants of the cited methods.

In spite of this diversity, topology-preserving mappings have essential common functional and structural components that are characterized in the following definitions.

1.3.1 GENERAL DEFINITIONS

1. Data Objects: Any data without any restrictions, such as sets, numbers, vectors, graphs, symbols, texts, images, signals, mathematical mappings and their representations, e.g. matrices, tensors etc., as well as any combination of data objects
2. Space: Any set of data objects, e.g. also a subset and or a superset of a set of data objects.

1.3.2 FUNCTIONAL DEFINITIONS

Input Data Here, raw data are here any data objects to be supplied to the data processing, e.g. sets, numbers, vectors, graphs, symbols, texts, images, signals, mathematical mappings and their representations, etc. These raw data serve directly as input data or are transformed into input data by suitable calculation procedures. In the following, therefore, it will not be distinguished between raw data and input data, only the term input data will be used. It is essential that the input data comprise those data objects, for which there exists a problem for the data processing related to the topology-preserving mapping, which should, so, be analyzed, visualized or in any way processed. Typical problems for the data processing of these input data are e.g. partitioning, clustering, embedding, principal component analysis, approximation, interpolation, extrapolation, dimension determination, visualization, control, etc. For the definition of the input data, two aspects are thus essential: input data are (i) given data objects or data objects calculated from given data objects, for which there exists a problem, i.e. "something given that something should be done with".

Structure Hypotheses: These are assumptions, e.g. about the structure of the input data. Structure hypotheses are assumptions that cannot be calculated from the input data without additional data objects that are independent of the input data of the topology-preserving mapping. This means, the assumptions
(i) are postulated ad hoc, whereby the hypotheses are chosen independently of the input data, or
(ii) are postulated ad hoc, whereby the hypotheses are influenced, but not completely determined, by predictable characteristics of the input data, or
(iii) can only be calculated by processing of the input data taking into account the topology-preserving mapping itself, i.e. by taking into account output data (refer to definition below), or are made by any combination of these procedures. Here, (iii) is a special case of (ii), in so far as a topology-preserving mapping requires structure hypotheses. Typical examples of the formation of structure hypotheses are:

- Ad (i) Choice of the grid topology in Kohonen's algorithm as a two-dimensional quadratic grid with a given number of grid nodes for both dimensions, independently of the input data,
- Ad (ii) Choice of the grid topology in Kohonen's algorithm as a two-dimensional quadratic grid with a given total number of nodes (ad-hoc components of the hypothesis), whereby the relation of the number of grid nodes for each dimension takes into consideration the relation of the variations of the input data distribution along both main distribution directions, as can be determined by the calculation of the two largest eigenvalues within a principal component analysis of the input data distribution (data-driven component of the hypothesis)
- Ad (iii) Choice of the grid topology depending on the data representation by the topology-preserving mapping itself, e.g. in growing self-organizing maps; choice of the grid topology, depending on the topology induced by the distribution of the codebook vectors, e.g. the topology induced in the case of a minimal spanning tree of the codebook vectors, or the topology induced by an ordering metric of the codebook vectors in the Neural Gas Algorithm.

Structure hypotheses are thus data objects that are required for the data processing and independent of the input data to be processed. "Independent" means that there is no calculation method by which these data objects can be calculated by using only input data of the topology-preserving mapping, i.e. without referring to structure hypotheses.

Output Data: These are data objects that can be interpreted as a result of the processing of the input data by the topology-preserving mapping. These are typically (i) codebook objects and quantities calculated from them, see definition below
(ii) structure hypotheses, motivated by codebook objects or values calculated from them.

Output data are, by no means, only codebook objects or structure hypotheses after a completed training of a topology-preserving mapping, but can correspond to any training level of the topology-preserving mapping.

1.3.3 STRUCTURAL DEFINITIONS

Exploration Space Space of the set of data objects, with which the topology-preserving mapping is trained, i.e. which are presented, i.e. which are entered in the calculation rule of the topology-preserving mapping for calculating the codebook objects (e.g. x in section 1.2). These data objects are following called exploration objects and, for historical reasons implied by the technical standard, also synonymously called feature vectors. Note that, according to the technical standard, these data objects correspond to the input data of the topology-preserving mapping.

Ordering Space: Space of the set of data objects that define topological relations, whereby these relations are used for the calculation of the output data of the topology-preserving mapping, e.g. in a cooperativity function, according to equation 9. An important example of an ordering space is the model cortex in Kohonen's algorithm, also called grid space or index space. The data objects of the ordering space are, in the following, called ordering objects or neurons. According to the technical standard, these are vectors in metric spaces. For historical reasons implied by the technical standard, in the following, they are also called grid vectors or position vectors. Note that, according to the technical standard, the data objects of the ordering space are determined by structure hypotheses. To clearly distinguish between the terms ordering space and exploration space, the definitions given for different topology-preserving mappings described in the literature are listed in section 2.3.

Outcome Space: Space of the set of data objects assessed as result of the processing of input data (e.g. codebook vectors of a self-organizing map). These are, in the following, called codebook objects.

The spaces above are not necessarily required to be different. Frequently, for example, the outcome space corresponds to the exploration space: This is the case in the self-organizing map in section 1.2. Here the feature vectors, in general, originate from the same space as the codebook vectors. An opposite example would be the clustering of observation series by Hidden Markov Models: Here, specific Hidden Markov Models can correspond to single codebook objects, while the observation series correspond to the exploration objects. As a further example, the ordering space can also be defined implicitly by the outcome space, e.g. as ordering metric for the Neural-Gas-Algorithm.

BRIEF SUMMARY OF THE INVENTION

2 Description of the Invention

Part I

The invention is thus based on the problem of improving data processing.

A method for data processing in accordance with the present invention, to be run on a data processing device, for the mapping of input data to output data, such as outputting codebook objects of an artificial neural network, where:

data objects to be processed are entered as input data, the entered data objects are processed, by using a topology-preserving mapping, by ordering of neurons in the ordering space, according to a given pattern, assigning of codebook objects in the outcome space to the nueurons, processing of codebook objects according to the calculation rule of a topology-preserving mapping, by use of data objects of the exploration space, and output of the processed codebook objects as output data hereby characterized that at least a part of the entered data objects is used to determine the order of neurons in the ordering space, and/or data objects, required for the data processing and independent of the input data to be processed, are entered, which are used as data objects of the exploration space.

Another aspect of the invention is a method of processing data for the mapping of data objects to be processed to distance objects, the method to be executed on a data processing device, including the following steps:

providing data objects to be processed;

calculating distances between the data objects to be processed as distance objects; and outputting these distance objects as output data;

the method characterized by the step of:

calculating the distances by use of at least one of statistical learning methods, local models, methods of inferential statistics, and one of the following specific computation methods:

(A) Levenstein Measure;
(B) Mutual Information;
(C) Kullback-Leibler Divergence;
(D) coherence measures employed in signal processing, in particular for biosignals;
(E) LPC cepstral distance;
(F) calculation methods that relate the power spectra of two signals, such as the Itakura-Saito Distance;
(G) the Mahalanobis-Distance; and
(H) calculation methods relating to the phase-synchronization of oscillators.

Yet another aspect of the invention is a method of processing data for the determination of the cluster validity, the method to be executed on a data processing device and including the following steps:
providing data objects as input data;
providing distance objects between these data objects;
providing an assignment of the data objects to be processed to groups by:
processing provided data objects by using a topology-preserving mapping, by:
ordering neurons in ordering space, according to a given pattern;
assigning codebook objects in outcome space to the neurons;
processing codebook objects according to the calculation rule of a topology-preserving mapping, by use of data objects of the exploration;
outputting the processed codebook objects as output data;
at least one of the following substeps
determining the order of neurons in the ordering space by using at least a part of the provided data objects;
providing said data objects that are independent of the input data to be processed and which are used as data objects of the exploration space; and
outputting a measure of the quality of this assignment as output data,
the method characterized by the step of:
calculating the measure of the quality of the assignment by employing at least a part of the provided distance objects.

A data processing device can be provided for running a method in accordance with the present invention. A computer program product, which is stored in a memory medium and contains software code segments, with which steps of a method in accordance with the present invention are carried out, can be provided for running on the data processing device.

Note that, according to the technical standard, data objects correspond to the input data of the topology-preserving mapping. An essential aspect of the invention is that this correspondence is removed.

A further important partial aspect of the invention is the generalization of the term ordering objects towards any data objects, e.g. distance objects between data objects. Note that, according to the technical standard, the data objects of the ordering space are determined by structure hypotheses. An essential aspect of the invention is to remove this correspondence.

To clearly distinguish between the terms ordering space and exploration space, the definitions given for different topology-preserving mappings described in the literature are listed in section 2.3.

In one embodiment of the inventive method at least part of the entered data objects is used to determine the arrangement of neurons in the ordering space. Alternatively or additionally, data objects required for the data processing that are independent of the input data are entered, which are used as data objects of the exploration space.

The distances may be calculated by statistical learning methods, local models, methods of inferential statistics and/or one of the following special computational methods: Levenstein measure, Mutual Information, Kullback-Leibler divergence, coherence measures employed in signal processing, specifically for biological signals, LPC cepstral distance, calculation methods that relate the power spectra of two signals to each other, such as the Itakura-Saito distance, the Mahalanobis distance, and/or calculation methods relating to the phase synchronization of oscillators.

The method may include an assignment of the data objects to be processed into groups for the determination of cluster validity. The measure of the quality of the assignment is calculated employing at least a part of the entered and/or calculated distance objects.

It should be mentioned that the term "data processing device" includes, besides the presently common ones (e.g. semiconductor-technology based computing systems), also all future realizations of data processing devices (e.g. quantum computers, biological, molecular, nuclear, optical, or on any biological, chemical, or physical principles of data processing based realizations, etc.).

It should be mentioned, that by the term "computer program product" a computer program or a computer program module is meant, which is embodied by storage (e.g. on a magnetic storage medium or in a volatile or non-volatile semiconductor memory of a computer) or by signals transmitted in a network, specifically in the internet. In this context, the computer program does not have to be available on an immediately executable form, but can also exist in a form prepared for installation in the data processing device, where, of course, it can be compressed, coded, broken up into packets and provided with headers for an eventual transmission through a network, etc.

The construction of a computer system, as a special realization example of a data processing device, will be roughly explained. Usually, such a computer system includes a computer, a monitor, an input keyboard, and a computer mouse. In place of the monitor, any other display devices can be used, as for instance a projector. In place of the mouse, also any other cursor-positioning device can be used, as for instance a trackball, a touchpad, a mouse stick, a touch screen, or cursor keys of a computer keyboard.

The computer has a first data storage device in form of a memory disc, such as a hard disk, CD or diskette, and a second data storage device in form of a main memory and/or a working memory. Information is transferred between the disc memory and the working memory. The transmission takes place, e.g. through usual interfaces and bus systems. The data processing is performed by a CPU (Central Processing Unit). In the disc memory, data are saved which the computer can get access to by appropriate control mechanisms. The computer further includes a network card, through which it can be connected, e.g., to a second computer. Moreover, the computer can include a so-called modem, through which it can be connected, over the telephone network and its respective provider, to the internet. The computer can also be a part of a direct PC connection, an additional computer of a computer cluster or a server of a network.

DETAILED DESCRIPTION OF THE PREFERRED EMBODIMENTS

2.1 Exploration-Organized Morphogenesis (XOM)

The central motivation of the present invention is based thus on a disentanglement of the functional and structural characteristics of topology-preserving mappings listed above.

Here it is decisive that, according to the technical standard, the input data are exploration objects, i.e. are taken from the exploration space and do not define data objects of the ordering space. Further, the structure hypotheses influence the ordering space and not the exploration space. According to the technical standard, the exploration space is thus assigned to the input data and the ordering space is assigned to the structure hypotheses.

The central idea of Exploration-Organized Morphogenesis (XOM) now is the partial reversion of these assignments.

XOM Definition: Method and device for data processing by topology-preserving mappings, whereby, in contrast to the technical standard both the exploration space and the ordering space can be determined in any way by input data or structure hypotheses. In particular, in contrast to the technical standard, input data can determine data objects of the ordering space and, reversely, structure hypotheses can determine data objects of the exploration space.

The statement that input data "determine" data objects of the ordering space means here that there is a calculation method, with which data objects of the ordering space can be calculated from input data without using structure hypotheses.

The statement that structure hypotheses "determine" data objects of the exploration space means here that there is no calculation method, with which these data objects can be calculated from input data without using structure hypotheses.

In contrast to the technical standard, the choice of the exploration space is not subject to any limitations in so far as its data objects can also be, besides input data, structure hypotheses. Reversely, in contrast to the technical standard, the choice of the ordering space is not subject to any limitations, as its data objects can be, besides structure hypotheses, input data as well!

In contrast to the technical standard, the ordering space can thus be assigned to the input data, and the exploration space can be assigned to the structure hypotheses.

A special aspect of the invention is, additionally, the generalization of the term ordering objects as defined above, beyond the interpretation as vectors in metric spaces, as is technical standard, towards any data objects, especially distance objects between data objects.

Distance objects are defined here as data objects that characterize similarity relations or distances between data objects, according to any distance measure. Here, both distance measures induced by metrics and, in particular, similarity relations or dissimilarities defined by any distance measures that do not satisfy a metric are included.

In summary, as differentiation from the technical standard there is, with the definitions above, the following

2.2 Technical Description

Figure 1:
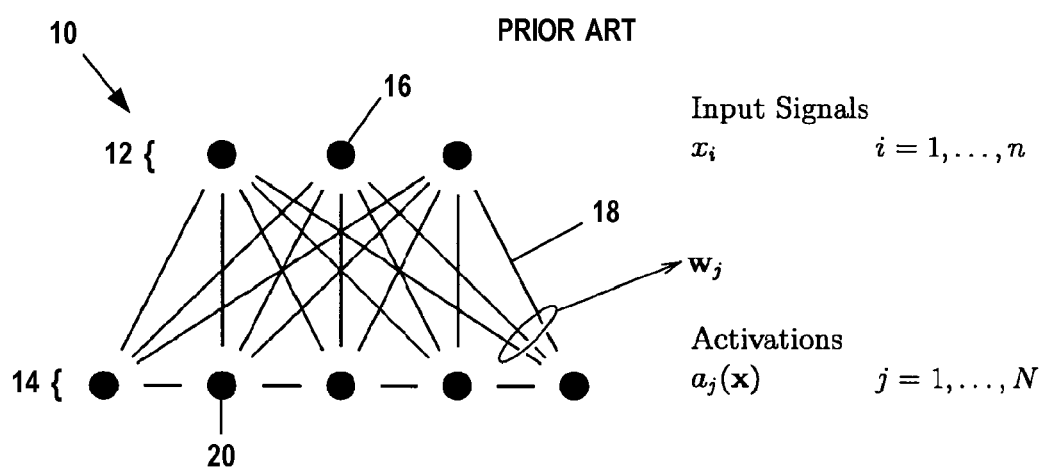
FIG. 1 is a schematic structure of a prior art vector quantizer.
Figure 2:
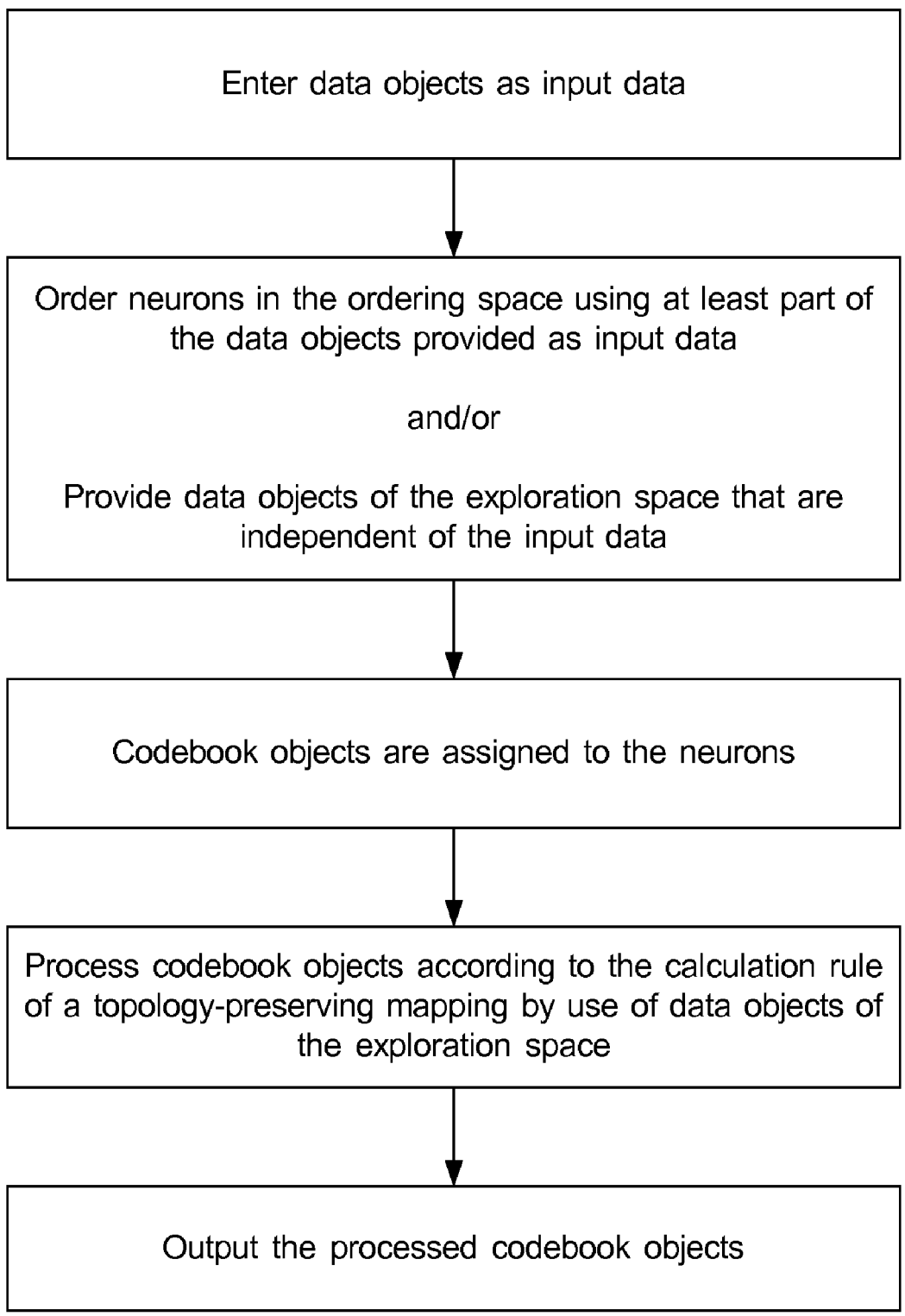
FIG. 2 schematically illustrates generating codebook objects in accordance with the present invention.

The invention-conform method (XOM) for the mapping of input data to be processed to output data comprises the following steps illustrated schematically in FIG. 2:

The data objects to be processed are entered as input data.

The entered data objects are processed by means of a topology-preserving mapping. For that Neurons are ordered in the ordering space, where, according to a first alternative, at least part of the entered data objects is used for determining the ordering of neurons in the ordering space.

Further, in doing so, codebook objects in the ordering space are assigned to the neurons.

Finally, in doing so, codebook objects are processed, according to the calculation rule of a topology-preserving mapping, by use of data objects of the exploration space (refer for instance to the technical procedure for the training of a self-organizing map presented in the introduction of the description in section 1.2).

According to a second alternative, in doing so, data objects (structure hypotheses) entered independently of the input data to be processed are used as data objects of the exploration space. The first and second alternative can be applied alone or in combination.

In the end, the processed codebook objects are delivered as output data.

2.3 Examples of the XOM Definition for Some Topology-Preserving Mappings

The XOM definition, as defined above, will be described exemplarily for some topology-preserving mappings described in the literature. It should, however, be emphasized that the invention is not limited to these examples, but can be applied in analogy, by use of the above definitions, for the function and structure components to any topology-preserving mappings, even if those are not explicitly listed here. It should be particularly emphasized that the invention is independent (i) of the concrete choice of free parameters of topology-preserving mappings, (ii) of the concrete choice of a cooperativity function, e.g. in the sense of the function $\Psi$ according to section 1.1, (iii) of the concrete choice of certain annealing schemes, e.g. for learning parameters in the sense of $\epsilon$ in section 1.1, (iv) of the kind of data presentation, i.e. if the exploration or ordering data objects are presented sequentially or in parallel in the sense of batch-algorithms, where in a single training step, more than one data object can be processed.

2.3.1 XOM for the Self-Organizing Map

Here, the input data can determine, according to the XOM definition, the data objects of the ordering space, while structure hypotheses can determine the characteristics of the exploration space. To the self-organizing maps, in connection with XOM, the following stipulations apply: The feature space of the self-organizing map, according to section 1.1, corresponds to the exploration space, the model cortex of the self-organizing map, according to 1.1 corresponds to the ordering space.

Figure 3:
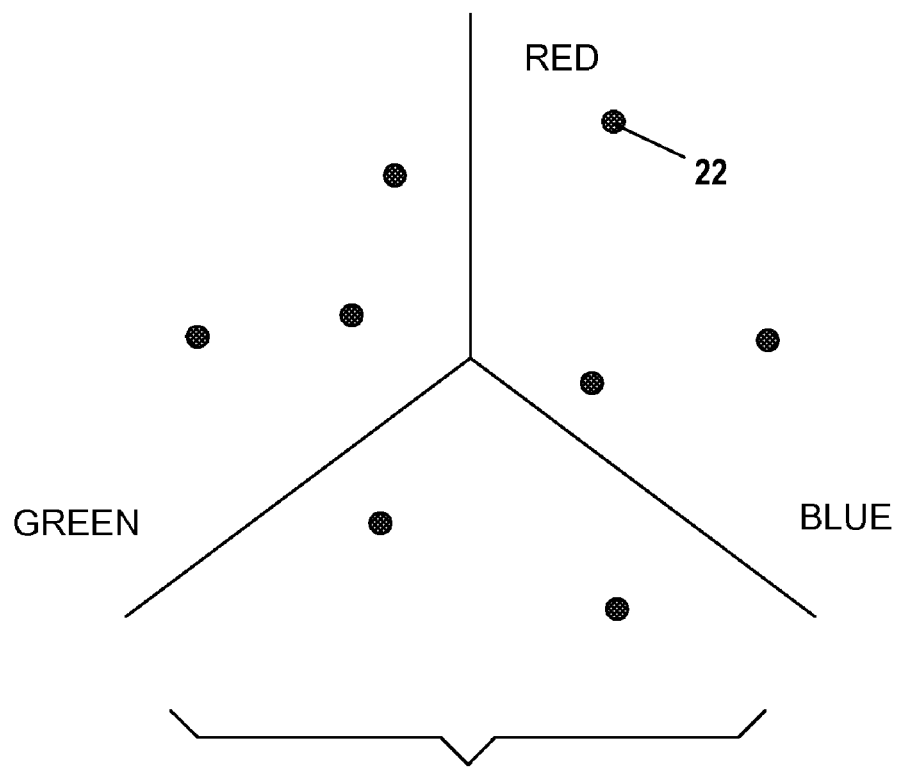
FIG. 3 illustrates the use of input data to determine the neurons of the exploration space for the method shown in FIG. 2.
Figure 3:
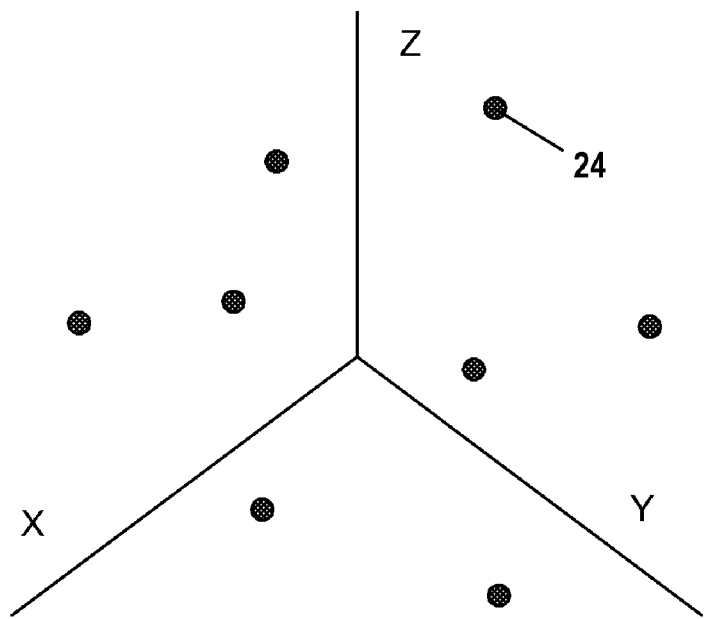

In the model cortex, according to section 1.2, thus input data are presented, i.e. the model cortex is wholly or partially determined by the input data. If the input data, for instance, are vectors Z in a k-dimensional metric space, i.e. $Z=\{(z^v)|z^v \in \Re^k, v \in \{1, \ldots, p\}, k, p \in \aleph\}$, then the position vectors of the self-organizing map can be set equal to these. For example, FIG. 3 illustrates input data realized as a randomly spaced set of vectors 22 that represent RGB (red, green, blue) in 3-dimensional space. The position vectors or neurons 24 of the self-organizing map are set to the vectors 22.

Figure 4:
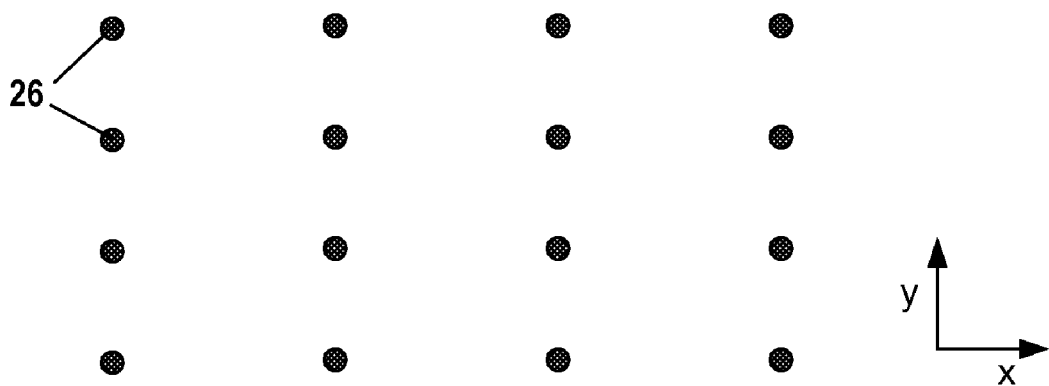
FIG. 4 illustrates the use of a structure hypothesis to determine data objects of the exploration space for the method shown in FIG. 2.

From this, in general, a topology of the ordering space determined by the input data results, which, in contrast to the technical standard in the use of self-organizing maps, does not correspond to a discrete periodical grid. The training of the self-organizing map is then carried out with data objects of any arbitrarily chosen exploration space. This exploration space can correspond to a structure hypothesis, or else be defined directly via input data. For example, FIG. 4 illustrates an exploration space for the neurons 24 consisting of a two-dimensional lattice of codebook vectors 26 generated from a structure hypothesis of a uniform distribution on a rectangular area. The codebook vectors have a dimension of 2, and would be randomly initialized, and each codebook vector assigned to a neuron 24. Sampling vectors would be randomly selected from the 2-dimensional area for training.

With the conventions of section 1.2, for instance, the following stipulation can thus be set: $r^v=z^v$. As exploration space, any set of data objects is then determined, e.g. data vectors on any manifold in $\Re^n$, which satisfy for example a uniform distribution, a Gaussian distribution, or any distribution described in probability theory. Any other specification of the exploration space is, in principle, conceivable as well, where this specification may depend on the input data or, in the sense of a structure hypothesis, may not unequivocally be computed directly from input data.

Besides the disentanglement of the structural and functional definitions of the data spaces employed in topology-preserving mappings, as described above, a special aspect of the invention consists, additionally, in the generalization of the term ordering objects defined above, beyond the interpretation as vectors in metric spaces, as is technical standard, towards any distance objects between data objects. In the case of self-organizing maps, this means that the topology of the model codex can be defined by any dissimilarities, which do not have to satisfy any metric in the mathematical sense. The ordering objects (neurons), thus, need not, represent vectors in k.

2.3.2 XOM for Generative Topographic Mapping

For the specification of the terms ordering space and exploration space in the Generative Topographic Mapping (GTM), the following stipulations are made: The space called "latent space" corresponds to the ordering space, its data objects are called "latent variables x" in this publication. The data objects of the exploration space are denoted by the variable t.

2.3.3 XOM for Topographic Vector Quantizers

For the specification of the terms ordering space and exploration space, the following stipulations are made about the topographic vector quantizers described in the literature (e.g. Topographic Vector Quantizer (TVQ), Soft Topographic Vector Quantizer (STVQ), Soft Self-Organizing Map (SSOM), Kernel-Based Soft Topographic Mapping (STMK), Soft Topographic Mapping of Proximity Data (STMP)): The data objects called "nodes", with the variable designation r or s, correspond to data objects of the ordering space. The data objects called "data vectors x(t)", correspond to the data objects of the exploration space.

By analogy, it is also possible to distinguish between exploration space and ordering space in other calculation schemes for topology-preserving mappings not described here.

3 Detailed Description of the Invention

Part II

In the following listing, additional methods, devices, and applications of the invention are described.

1. (a) XOM Definition: Method and device for data processing by use of topology-preserving mappings, whereby, in contrast to the technical standard, both the ordering space and the exploration space can be defined freely by input data or by structure hypotheses. In particular, in contrast to the technical standard, the input data can define data objects of the ordering space and, vice versa, structure hypotheses can define data objects of the exploration space.

The statement that input data "define" data objects of the ordering space, means here that there is a calculation method, which allows the calculation of data objects of the ordering space from input data without consideration of structure hypotheses.

The statement that structure hypotheses "define" data objects of the exploration space, means that there is no calculation method, by which these data objects can be calculated from input data without consideration of structure hypotheses.

Unlike the technical standard, the choice of the exploration space is not subject to any limitations, in so far as its data objects can be, besides input data, also structure hypotheses.

Hereby, it is explicitly not required that the data are uniformly distributed on a single manifold in $\Re^n$, but can distributed by any distribution in any data spaces. Examples of interesting distribution patterns are listed below in 5. During the training process, or in the context of a series of training processes of the topology-preserving mapping, these distribution patterns can also be chosen dynamically variable, e.g. under consideration of the output data or results supplied by the topology-preserving mapping at the current or at an earlier state, like codebook objects or the topology induced by these objects, whereby, in particular, dynamical structure hypotheses can be generated. It should be emphasized as well that the chosen distributions in the exploration space may be influenced statically or dynamically by the input data.

Reversely, also the choice of the ordering space is, in contrast to the technical standard, not subject to any limitations, as the data objects can be, besides structure hypotheses, input data as well!

In contrast to the technical standard, thus, the ordering space can be assigned to the input data and the exploration space can be assigned to the structure hypotheses.

A special aspect of the invention is, additionally, the generalization of the term ordering objects as defined above, beyond the interpretation as vectors in metric spaces, as is technical standard, towards any data objects, in particular distance objects between data objects.

Distance objects are defined here as data objects that characterize similarity relations or distances between data objects, according to any distance measure. Here, distance measures induced by metrics, as well as, in particular, similarity relations or dissimilarities defined by any non-metric distance measures, are included.

XOM can, in particular, also be used for data processing, if more than one connected data distribution in the exploration space is used for the training; if no uniform data distribution in the exploration space is used for the training; if the data objects in the ordering space, or subsets thereof, do not satisfy any metric in the mathematical sense; if the data distributions in the exploration space, used for training, are not convex; if the data objects in the ordering space or in the exploration space, or subsets thereof, do not satisfy the Euclidian geometry or their distance is defined by any dissimilarity measure; if distances of any data objects are used for the training, e.g. geodetic distances or a rank metric; if the topology-preserving mapping does not correspond to the sequential formulation of a self-organizing map after Kohonen; if the distribution of the training data in the exploration space, employed for the training of the topology-preserving mapping, has a dimension other than 2 or 3; if the distribution of the training data in the exploration space, employed for the training of the topology-preserving mapping is not a 3D sphere; if the training rule of the topology-preserving mapping can distinguish on its own for different codebook objects, see also item 1m; if not all connections or topological relations, for which the distances are known or have been calculated, are displayed for the visualization of the results.

(b) Irregular Structure of the Ordering Space: An essential aspect of the invention is that in XOM the limitation of the ordering space to discrete periodical grids in $\Re^n$, e.g. regular cubical or hexagonal grids, as it is technical standard, is removed, in particular, if input data are used to determine characteristics of the ordering space, for instance its topology and/or structure hypotheses are used to determine the characteristics of the exploration space. Particularly protected is the use of ordering spaces with a fractal local or global dimension.

(c) Combination of an Irregular Structure of the Ordering Space with XOM: It should be specifically emphasized that such methods and devices are a special aspect of the invention, with which an irregular structure of the ordering space, according to 1b, is given and, at the same time, input data (and not only structure hypotheses) are used to determine the characteristics of this ordering space, e.g. to specify its topology.

(d) Determination of the Exploration Space by means of Structure Hypotheses Another essential aspect are methods and devices that use structure hypotheses (and not only input data) to determine the characteristics of the exploration space.

(e) Arbitrary Distance Measures, e.g. Pairwise Dissimilarities: A special aspect of the invention is the generalization of the term ordering objects as defined above, beyond the interpretation as vectors in metric spaces, as is technical standard, towards any data objects, in particular, distance objects between data objects. This is of special interest if the ordering objects are defined by use of input data.

Distance objects are defined here as data objects that characterize similarity relations, or distances between data objects, according to any distance measure. Here, distance measures induced by metrics as well as, in particular, similarity relations or dissimilarities defined by any non-metric distance measures, are included. An important example is the use of a rank metric (e.g. in analogy to the definition of the rank metric between the winner neuron and other codebook neurons in the Neural-Gas-Algorithm). Distances between data objects, i.e. distance objects can thus, in principle, be defined by any calculation methods or also by structure hypotheses.

It should also be stressed that it is not necessary for the invention, regarding a distance measure, to calculate all pairwise distances between the input data objects, or ordering objects, or to use all of them for the training of the topology-preserving mapping. It is also not necessary to define these distances for all pairs of data objects. It is sufficient to use any subset of the calculable pairwise distances. This subset can be adapted to the current objective, or to the circumstances of the data processing, eventually also dynamically. Such an adaptation is required in numerous situations, e.g. (i) in the so-called Sparseness Annealing (refer to following), (ii) in the visualization of graphs, where not all edges between the nodes are known, or should be considered in the calculation, (iii) in molecular-dynamics simulations, where due to the constraints defined by the covalent structure of the molecule, or the forces acting between the single atoms, only a proper subset of the pairwise distances between the atoms is defined or should be used for the training of the topology-preserving mapping, (iv) in robotics applications, e.g. in the context of inverse kinematics, where e.g., due to constraints, only a proper subset of the pairwise distances between the robot articulations are defined or should be used for the training of the topology-preserving mapping.

Particularly interesting is the case of sparsely coded distance matrices.

(f) Non-Metric Ordering Spaces and Input Data Spaces: It should, once more, be specifically emphasized that, in contrast to the technical standard, methods and devices are included in the invention, which employ, in a mathematical sense, non-metrical distance measures for the determination of the topology of the ordering space, in which e.g. for a proper or improper subset of the pairwise distances, the symmetry relation and/or the triangle inequality are not satisfied.

The ordering objects thus, in contrast to the technical standard, can define a non-metric space. This partial aspect of the invention is specifically protected in situations where not only structure hypotheses, but also input data are used to determine the topology of the ordering space.

(g) Non-Euclidian XOM: The ordering space, exploration space or outcome space, or any combination of these spaces, can satisfy a non-Euclidian, or hyperbolic geometry.

(h) Local Neighborhoods, Acceleration by Fast Search of Nearest Neighbors, Sparse Distance Matrices: For the training of the topology-preserving mapping, specifically, only, or only partially, data objects from local neighborhoods of the data objects in the ordering space and/or exploration space, i.e. thereby created sparsely coded distance matrices, can be used. For this, in particular, acceleration strategies for the definition of the local neighborhoods, e.g. for the search of the k nearest neighbors, can be used, according to the technical standard.

(i) Fractals: A special aspect of the invention is that, in methods and devices according to the definition of XOM above, data distributions can be used as ordering spaces, which, according to the dimension determination methods described in this patent application, have locally or globally a fractal dimension. Local, here and in the following, means that the dimension determination is carried out for single data objects, whereas global means that the dimension determination is carried out for more than one data object, e.g. for a complete data set. Reversely, data distributions with a fractal dimension can also define the exploration space. Specifically protected are methods and devices, where the ordering space contains data distributions with a fractal dimension, whereby these data distributions are input data, as well as methods and devices, where the embedding space comprises data distributions with a fractal dimension, whereby these data distributions are structure hypotheses. Specifically protected is also the combination of both possibilities.

(j) Non-Orientable Surfaces, Möbius Scarf and Klein Bottle: The ordering space, as well as the exploration space can contain data distributions in which the topology induced by the data objects in the respective spaces describe a non-orientable surface, in the sense of the differential geometry, e.g. a Möbius scarf or a Klein bottle. Specifically protected are methods and devices, where the ordering space contains such data distributions, whereby these data distributions are input data, as well as methods and devices where the exploration space contains such data distributions, whereby these data distributions are, structure hypotheses. Specifically protected is also the combination of both possibilities.

(k) Stochastic XOM: The ordering space as well as the exploration space can contain data distributions that result from a random experiment. Specifically protected are methods and devices, where the topology induced in the ordering space by the data objects is influenced by a random experiment, or where the data objects of the exploration space are influenced by a random experiment in the sense of a structure hypothesis, as well as combinations of both possibilities.

(l) Addition or Omission of Data Objects in the Ordering Space: Based on the definition of XOM, methods and devices can be constructed, where, during a training process, or before or during a series of training processes of the topology-preserving mapping, one or more new data objects, specifically also distance objects, are added to the ordering space and the topology-preserving mapping is retrained partially or completely. Specifically, this method can be employed for interpolation, extrapolation, or approximation of new data objects by the topology-preserving mapping. Reversely, data objects, specifically also distance objects, in the ordering space can be removed or freely modified, before the topology-preserving mapping is partially or completely retrained. Specifically, measures of local or global mapping quality, e.g. in the sense of 2, can be used to create, remove or modify data objects of the ordering space in a goal-directed way.

(m) Codebook-Object-Specific Variation of the Calculation Rule: It should be stressed that, based on the definition of XOM, specifically also methods and devices can be developed, where in the training of the topology-preserving mapping not all the codebook objects belonging to the data objects in the ordering space are trained according to the same calculation rule. Rather it is often possible and/or required to apply different calculation rules to different codebook objects, or to modify parameters of the same calculation rule for different codebook objects. Both variations can also occur dynamically during a single training process, or in a series of training processes. Specifically, methods and devices are possible as well, where not always just one codebook object is assigned to each data object of the ordering space. Rather, different numbers and kinds of codebook objects can be assigned to different data objects of the ordering space, whereby these numbers and kinds can also be chosen as dynamically variable, e.g. regarding the specific data processing problem, the current training state of the topology-preserving mapping, the mapping quality presently or previously achieved, or any additional constraints, e.g. those induced by the data analysis problem. Also data objects of the ordering space may exist, to which permanently or temporarily no codebook objects are assigned. An important example of the dynamic, code-book-specific adaptation of the calculation rule is the adaptation of the cooperativity function of self-organizing maps, with regard to the measures of local topology preservation.

(n) Data-Object-Specific Variation of the Characteristics, e.g. Calculation Rule for Data Objects of the Exploration and/or Ordering Space: The data-object-specific variability described in 1m is also valid in the same sense for different objects of the exploration space and/or of the ordering space, e.g. the calculation rule of the topology-preserving mapping can vary in a data-object-specific way. Specifically, it can also be chosen as dynamically variable, e.g. with regard to the specific data processing problem, the current training state of the topology-preserving mapping, the mapping quality presently or previously achieved, or any additional constraints, e.g. those induced by the data analysis problem. In addition, data objects of the exploration, outcome and/or ordering space can be dynamically variable, regarding, for instance, the criteria just mentioned, e.g. new data objects can be dynamically created and existing data objects can be dynamically removed or in any way modified.

(o) Supervised XOM: The training of the topology-preserving mapping can be performed in dependence of data objects or characteristics of data objects that are associated to data objects of the ordering space. An interesting case is if data objects of the ordering space are associated to further data objects, which do not appear in the ordering space, or if data objects of the ordering space have additional characteristics, which are, permanently or temporarily, not taken into account for the determination of the ordering space. It is a specifically important case, if these additional data objects or characteristics of data objects are interpreted as function values specified for data objects of the ordering space. Here again, one case is specifically important, where these additional data objects or characteristics of data objects are used to modify the exploration space, the ordering space, the outcome space, or the data processing rule on which the topology-preserving mapping is based, or its parameters in a goal-directed way, specifically in a data-object-specific way. With this, different XOM-based methods and devices for supervised learning can be constructed, in particular for interpolation, extrapolation, and approximation or for any other kind of function processing. It should be stressed that the data objects of the ordering space as well as the additional data objects and object characteristics associated to them, can be input data as well as structure hypotheses.

(p) XOM under Additional Constraints: A specifically important variation of XOM consists in the training of the topology-preserving mapping being influenced by additional constraints, which influence any characteristics of the exploration space, ordering space, or outcome space, e.g. regarding the specific data processing problem, the current training state of the topology-preserving mapping, the mapping quality presently or previously achieved, or any additional constraints, e.g. those induced by the data analysis problem. It is, for instance, possible to limit the movement of a proper or improper subset of the codebook objects in the outcome space, statically or dynamically, or to influence it in any other way.

(q) Dynamically Variable Exploration Space, Growing XOM Mappings: XOM implementations should be specifically emphasized, where the exploration space or its data objects during a training process, or over a series of training processes of the topology-preserving mapping are influenced in a goal-directed or not goal-directed way, i.e. where they are dynamically variable, for instance regarding criteria of the currently or previously achieved local or global quality of the topology-preserving mapping, e.g. in the sense of 2. Specifically important is the case of XOM-mappings with growing, shrinking, dividing or in any other way locally or globally changing exploration spaces, for which successively structure hypotheses shall be improved, e.g. via input data.

(r) Rescaling of the Distances in the Ordering Space, Sparseness Annealing Specifically interesting XOM methods and devices change the topology of the ordering space during a training process, or over a series of repeated training processes of the topology-preserving mapping, e.g. by a mathematically expressible calculation rule. This rule can depend, for instance, on a currently or previously achieved mapping quality or on the current number of training steps or training runs. If the topology of the ordering space is represented by a proper or improper subset of the pairwise distances between the data objects of the ordering space, then an global resealing, i.e. referring to all the used distances, as well as a local, i.e. individually adapted, resealing of specific distances can be performed. With this resealing, e.g. an increase of the proportion of large distances to the total number of the utilized distances in the course of one or more training procedures of the topology-preserving mapping can be achieved.

If these large distances have little influence on the training of the topology-preserving mapping, they can be neglected for the further training. This corresponds to an increasing functional 'sparsing' of the distance matrix, i.e. the number of distances to be considered in the training of the topology-preserving mapping decreases. This implies, among other things, a reduction of the computational expense. This method is called "Sparseness Cooling" or "Sparseness Annealing". One of an arbitrary number of possible schemes is for instance the following: If $d_{ij}(t)$ are the distances between the data objects i and j of the ordering space at the training step t, and $d_{ij}$ are the original distances, a scale change according to $$d_{ij}(t) = \left(\frac{d_{ij}}{\sigma(t)}\right)^\alpha$$

where $\alpha>0$, can achieve that $d_{ij}(t)>d_{ij}$ for $d_{ij}>\sigma(t)$. Here, $\sigma(t)$ can be chosen as a function monotonically decreasing with t (e.g. in the sense of a cooling scheme as in equation (10)). By variation of $\alpha$, the degree of the non-linear distortion can be influenced. With the resealing rule $$d_{ij}(t) = d_{ij}\left(1 + \left(\frac{d_{ij}}{\sigma(t)}\right)^\alpha\right)$$

and $\alpha\gg1$, the distances for $d_{ij}<\sigma(t)$ stay almost constant, whereas for $d_{ij}>\sigma(t)$ they are clearly upscaled. Under certain circumstances, it can be useful to consider only distances in a certain interval $[a, b]$ where $a, b\in\Re$, $a, b\geq 0$ for the training of the topology-preserving mapping. For this, one could set, for instance:

$$d_{ij} \leftarrow \begin{cases} 0 : d_{ij} < a \\ d_{ij} - a : d_{ij} \in [a, b] \\ \infty : d_{ij} > b. \end{cases}$$

It should be stressed that the resealing of the distances is not limited to this or similar calculation rules, but can be applied in a problem-directed way, in any form regarding the given data processing situation. Further, it is not necessary that rescalings depending on the training status of the topology-preserving mapping are recalculated in every training step. Rather it can be sufficient to do this only after a series of several training steps, which can result in a considerable reduction of the computational expense.

(s) Iteration: Methods and devices according to the XOM definition can also be used iteratively, in the way that data objects of the outcome space of a topology-preserving mapping, trained according to XOM, are used, fully or partially, to define, or, at least, to influence the ordering space of a further topology-preserving mapping or of a new training step or training process of the same topology-preserving mapping. This should be explained in an example: If, for instance, a non-linear embedding of a data distribution in $\Re^k$, used as ordering space, into a data distribution in $\Re^n$ used as exploration space, is carried out by means of XOM, with k, n$\in\aleph$, then, in the simplest case, the outcome space resulting will be a set of codebook vectors in $\Re^n$. These can now be used, directly or by use of an appropriate calculation rule, to define the ordering space of a new XOM mapping, which, for instance, maps the topology induced by these codebook vectors to a data distribution in $\Re^m$, m$\in\aleph$. I.e., this topology is then used as exploration space of a topology-preserving mapping. From the outcome space of the first application of XOM the ordering space of a further application of XOM is generated. This procedure can be iterated without limitation. In an important special case, the outcome space or the exploration space, on one side, and the ordering space on the other, exchange their roles mutually. This can also be performed iteratively. Of course, the choice of the determining data objects, spaces, and distance measures is not subject to any limitations.

(t) Self-Organization, Self-Regeneration, Self-Reproduction, Morphogenesis, Distributed Knowledge Representation: With XOM, efficient methods and devices can be constructed, which possess characteristic properties of living systems, specifically self-regeneration, self-reproduction, and self-stabilization, locality of information processing or distributed knowledge representation. The following example illustrates the construction of such a system: The starting point are data objects, in the following denoted as "cells". These represent parts of a system, in the following denoted as "organism". A cell owns the following data objects, characteristics, methods or devices, in the following denoted as "elements":

Information, necessary for partially or completely building the ordering space of a topology-preserving mapping. This corresponds to the "blueprint" of the organism. It does not have to be contained completely in each cell.

Method and device, with the help of which the cell can determine which data objects of the ordering space, exploration space and/or outcome space of a topology-preserving mapping are assigned to it, and in which way. The information gained by this is in the following denoted as the "position" in the respective space.

Method and device, with the help of which the cell can communicate its positions in the ordering space, exploration space, and/or outcome space or other information to other cells and utilize such information communicated from other cells.

Method and device, with the help of which the cell can determine a new position in the outcome space by use of a XOM mapping.

Method and device, with the help of which the cell can modify its position in the outcome space, e.g. with regard to the new position in the outcome space determined by use of a XOM mapping.

Method and device, with the help of which the cell can check and, if necessary, correct the consistency of its positions in the different spaces.

Optionally, the following elements can also be present:

Method and device for the self-copying of the cell

Method and device for the self-destruction of the cell

Method and device for the modification of the data objects or characteristics of the cell.

It should be stressed that a cell does not have to own all elements listed above. It is also to be stressed that the elements listed do not have to be represented "locally", i.e. in each single cell. It is rather possible that the cell has access to global representations of the elements described above, i.e. representations related to more than one cell. This can, in particular, provide advantages for the construction of XOM-based technical systems.

The "life", i.e. the functional status of the organism, is then determined essentially by XOM. In the following, a typical example of this, a sequential procedure where all cells take part in all steps, will be outlined. However, these conditions do not have to be fulfilled, i.e. other procedures can be developed in analogy, where not all cells participate in every step and/or parallel data processing takes place, i.e. the processing of several data objects at one time. The following presentation is motivated by the procedure for self-organizing maps. It can be, however, easily adapted to other topology-preserving mappings.

First, a data object of the exploration space of a topology-preserving mapping is chosen, in following called "stimulus". All cells then determine their position in the exploration space in relation to this stimulus. It is for instance possible that the cell determines the distance (in any distance measure), between itself and this stimulus in the exploration space. The cells exchange information about their relative position to this stimulus. The cells now compare this information and determine one cell, whose position in the exploration space corresponds best to the stimulus, the so-called "winner cell". This winner cell then communicates its position in the ordering space to all other cells. The cells compare this information with their knowledge of the ordering space. It is essential that this knowledge is locally available in each cell (distributed knowledge representation). This knowledge corresponds to a "blueprint" of the organism, available partially or totally in each cell. By this, it is possible for the cells to determine the position of the winner cell in the ordering space. By comparison of their own position in the ordering space to that of the winner cell, the individual cells can determine their distance (in any distance measure) from the winner cell in the ordering space. By means of XOM, the cells then use this distance to update their position in the outcome space. With the presentation of a new stimulus, the procedure starts again.

It is important that the cells can determine their (relative) position in the exploration space, ordering space, and outcome space, depending on the topology-preserving mapping applied. This can be achieved e.g. by an information exchange in local surroundings of the cells in the different spaces. The cells check the consistency of the positions they take in the different spaces and correct these accordingly, continuously or occasionally.

The position determination in the different spaces can be realized, for instance, as follows: All cells produce one or more "products", e.g. fields, chemical substances or data objects of any kind. These spread over a respective space according to suitable calculation rules. Eventually they decline, depending on the spatial and/or temporal distance to their creation, or they change their properties. Because of the local determination of the resulting field intensities, concentrations of substances, or characteristics by the individual cells, these can determine their position in the respective space. Here, a space-direction determined integration over the concentration or characteristics of the products is conceivable, which can be performed in the individual cells or by information exchange in local cell communities. An elegant form of the position determination in the ordering space can also be performed by XOM: Here, the positions of the cells in the exploration space or outcome space are used as ordering space of a new topology-preserving mapping and vice versa. The roles of exploration space, resp. outcome space and ordering space are thus swapped, in the sense of is. The training of the new topology-preserving mapping results in estimated values for the cell positions in the ordering space, which can be compared to the positions in the ordering space currently stored in the cells. Then, if necessary, these can be updated.

Depending on such position determinations and consistency tests, local or global corrections of the cell number and cell characteristics in the organism can be made. For this, if necessary, new cells can be created or existing cells can be destroyed or modified. A global correction measure is, for example, the total number of cells in comparison to the total number of data objects in the ordering space.

It is essential that such correction-motivating consistency measures can be found from criteria of the mapping quality of topology-preserving mappings, as they are described, e.g., in 2. Here, measures for the assessment of the local or global topology preservation are specifically important. If, for instance, a position determination in the ordering space is carried out with XOM, as described above, then knowledge about the strength and/or kind of local topology violations can be used to perform local corrections with regard to cell number and cell characteristics. If, vice versa, the position of a cell in the exploration space or outcome space is determined by XOM, then such consistency measures can also provide a basis for appropriate corrections, e.g., in the sense of 1m, 1n or 1q.

A characteristic property of such XOM-based systems is that for identical or similar cell equipment, each cell, in principle, can adopt and, in particular, also modify any position and any function in the organism. The general structure and function of the organism remains essentially unchanged. The individual cells in such processes and devices thus remind of the "pluripotent stem cells" known in biology. This flexibility of the cells can, however, be limited, which can be denominated "cell differentiation", following the similarity to biological systems.

The exploration space can be described best as "body", in the sense of a space occupied by the organism. If this body is variable, or subject to external influences, then the organism can stabilize itself or adapt to the new conditions of the habitat with help of adaptive training of the topology-preserving mapping according to XOM.

If parts of such XOM-based systems are removed or destroyed, the systems can regenerate according to the processes described above. If such systems are divided into two or more parts, complete organisms can develop from the single parts. These systems have thus the ability of self-regeneration and self-reproduction, whereby self-regeneration can be seen as a condition for self-reproduction by division of the organism. A new system, with all characteristics of the complete organism, including its form and shape, can develop from small parts of the organism as well as from few or single cells. Consequently, based on XOM, one can construct methods and devices with the ability of morphogenesis, or simulate self-organization processes in nature and technology. The protection claimed in this patent application refers to both individual systems and ensembles of such systems.

Obviously, numerous extensions of such systems can be thought of: Principles from the fields of biology, especially genetics, or evolutionary computing can be applied to "breed" methods and devices as described above, with specific characteristics, or to improve these, on the level of single cells as well as on the level of complete organisms. In this sense, also a double or manifold representation of the ordering space in each cell, as "blueprint" of the organism, could be thought of, in analogy to the diploid chromosome set in somatic cells of biological organisms, or the possibility of sexual reproduction of organisms or cells with appropriate inheritance schemes.

Furthermore, it should be emphasized that the information processing in the XOM systems described here can also be hierarchical. The training of the topology-preserving mapping, for instance, can go through different hierarchical levels, e.g. by choice of subsets of the data objects of the ordering space to be represented, or sets of "prototypical data objects" obtained from the distribution of data objects in the ordering space by application of suitable calculation methods. This can also happen, where appropriate, in dependence of the current system status or organizational level, e.g. a suitably determined "life stage of the organism". For this, for instance, a vector quantization of the ordering space can be performed. Specifically, it can be helpful to represent, in the individual cells, information about different ordering spaces, to be used for the XOM mapping depending on the system status. Thus, or by use of similar methods, it is possible to first develop the basic structure of an organism and then, at later stages, its fine structure.

An essential criterion for a method or device in the sense of a XOM organism as described above is that information about the ordering space is assigned to data objects of the ordering space, which exceeds the data objects themselves, i.e. which is originally not included in the object (e.g. about the topology of the ordering space). This information serves as locally stored information on the structure of the whole system in the sense of a complete or incomplete "blueprint". This blueprint can be used to create, remove or modify cells, as defined above, or assigned data objects in the ordering space, outcome space, and/or exploration space.

(u) Hierarchical XOM: In XOM, the training of the topology-preserving mapping can go through different hierarchy levels, for instance by choice of subsets of the data objects of the ordering space represented by the topology-preserving mapping or by sets of "prototypical data objects" obtained from the distribution of data objects in the ordering space by application of appropriate calculation methods. These can be created, for instance, by vector quantization of the ordering space.

(v) Dynamic XOM: As already mentioned, it is possible to modify the data objects or their distribution in the ordering space or in the exploration space during a training process, or over a series of training processes.

(w) Test Phase of an Already Trained XOM: Finally, after the training of a topology-preserving mapping has been completed in the sense of XOM, new data objects can be added to the ordering space, exploration space, or outcome space and processed by use of this topology-preserving mapping without further training of this mapping. This can be done, for instance, for the purpose of interpolation, extrapolation, embedding, hard or fuzzy clustering, classifying, supervised mapping by means of functions or relations, visualization or sorting, or in the context of processes related to self-organization or morphogenesis. Here, also methods according to the technical standard can be employed.

2. Quality Assessment: Here, the emphasis is set on methods and devices for the assessment of the local or global mapping quality of the topology-preserving mapping employed according to 1. This quality can be examined, for example, by:

(a) Topology and Distribution Preservation: For this, the determination of local and global topology-preservation measures in accordance with the technical standard can be performed, e.g. the so-called topographic product, or comparable measures. A quality assessment can also be performed by analyses of measures of the distribution-preservation, e.g. so-called "distortion exponents", which can describe the density of the codebook objects in the outcome space in relation to the density of the data objects in the exploration space or in the ordering space.

(b) Distortion Measures: The examination of the XOM mapping quality can be performed by determination of distortion measures such as, for example, the cost function of non-linear embedding methods, e.g. of Sammon's Mapping, of so-called "Minimal Wiring" cost functions, or by comparative determination of the rank of nearest neighbors in the ordering space or outcome space, e.g. after the presentation of a data object in the exploration space.

(c) Distance Plot: The testing of the XOM mapping quality can be performed by creation and/or analysis of so-called "distance plots". Here, the distances between data objects in the outcome space (or exploration space) are graphically plotted against the distances of corresponding data objects in the ordering space, e.g. the pairwise distances of the codebook vectors in the feature space of a self-organizing map against the pairwise distances of the corresponding position vectors in the model cortex. However, the corresponding distances in the different spaces can also be comparatively analyzed without a graphical representation. In the following, for reasons of simplicity, this case will also be treated as a "distance plot". It is not necessary to use all calculable pairwise distances in each space. The analysis can be performed, for instance, by qualitative visual observation and interpretation of the distance plot, by calculation of measures for the "width" of the distance plot, of the correlation measures between the distances in the different spaces, such as correlation coefficients or covariance, or by means of methods for the global (i.e. regarding all distance pairs) and local (i.e. regarding single distance pairs) dimension determination of the distance plot, e.g. in the sense of the Hausdorff dimension or Grassberger-Procaccia dimension. Specifically, it should be stressed, that such analyses can be performed selectively for different dimensions of the distances in the exploration space, outcome space, and ordering space. Specifically, a selective analysis of the distance plot allows the observation and quantitative evaluation of convolution phenomena of the topology-preserving mapping for large distances, as well as of local topology violation for short distances. The measures cited above, or similar ones, can also be used as instruments for the comparative determination of the dimensions of data distributions in the different spaces.

(d) Outcome Plot and Exploration Plot: A quality assessment for XOM can also be performed by creation and/or analysis of a plot of the codebook objects in the outcome space or of the data objects in the exploration space corresponding to these codebook objects, specifically if outcome space and exploration space are identical. In particular, data objects and/or topological relations of the data objects of the ordering space corresponding to the codebook objects can be visualized and analyzed by means of connection lines or other graphical aids (lines or graphical objects of different thickness, color, shade, structure or texture). Specifically protected are such representations in combination with the representation of data objects of the exploration space and/or outcome space, or their topological relations. Here, also the representation of the local value of quality measures of the employed topology-preserving mapping, by means of any graphic tools, concerning distortion, topology or distribution preservation as well as information obtained by supervised learning from distance plots and quality assessments, deserves special emphasis. As the mentioned ways of representation are an essential aspect of the XOM-based exploratory analysis of the ordering space and its topology, they are to be specifically protected by this patent, in particular in cases where the ordering space is determined totally or partially by input data, or if the exploration or the outcome space is determined totally or partially by structure hypotheses. The remarks in this section are generally valid for data objects and for data objects newly calculated from data objects or space regions assigned to data objects.

(e) Ordering Plot: Vice versa, data objects of the exploration space and/or outcome space can be visualized in the ordering space. Specifically, data objects and/or topological relations of the data objects in the exploration space or outcome space can be visualized and analyzed by means of connection lines or other graphical aids (lines or graphical objects of different thickness, color, shade, structure, or texture). Such a representation is specifically protected when combined with the representations of data objects of the ordering space or their topological relations. Here, also the representation of the local value of quality measures of the employed topology-preserving mapping, by means of any graphical tools, concerning distortion, topology or distribution preservation as well as information obtained by supervised learning from distance plots and quality assessments, deserves special emphasis. As the mentioned ways of representation are an essential aspect of the XOM-based exploratory analysis of the exploration space, of the outcome space, or of their characteristics, they should be specifically protected by this patent, in particular in cases where the exploration space or the outcome space is determined totally or partially by structure hypotheses or if the ordering space is determined wholly or partially by input data. The remarks in this section are generally valid for data objects and for data objects newly calculated from data objects or space regions assigned to data objects.

(f) Quality Assessment with Supervised Learning: The XOM mapping quality can also be determined by the utilization of so-called supervised learning methods for the mapping of the different data spaces involved in the topology-preserving mapping onto each other. Here, a learning method or a learning device is trained on pairs of data objects, a pair consisting of one or more source data objects as well as of one or more target data objects. The source data objects are here taken from a source space, the target data objects from a target space. In a so-called test phase, after the training has been completed or is in an advanced stage, if new source data objects, without the corresponding target data objects, are entered, an estimation of the assigned target data objects can be obtained, by taking into account the trained mapping. Typical supervised learning methods are for example various neural networks (e.g. Multilayer Perceptrons, Radial Basis Functions Networks, Support Vector Machines as well as numerous variations of these methods), local models, as local average models or local linear models, as well as all approximation or interpolation methods described in the literature. Topology-preserving mappings can also be used for supervised learning, for instance by splitting of the exploration space in source and target spaces of self-organizing maps in accordance to the technical standard, or by splitting of the ordering space in source and target spaces for XOM. Starting from exploration space, ordering space, and outcome space, any of these three spaces can serve, in principle, as source space or target space. If source and target space differ, then, at first, six possibilities for the supervised training of mappings between the three data spaces exist. However, any concatenation of these mappings can be thought of, whereby the source space can also correspond to the target space. The mapping quality of XOM can then be determined in the test phase of the mapping that has been trained in a supervised manner, by determination of a suitably quantified mapping error, i.e. the difference between the actual and the expected value of target data objects. Here, any distance measures can be used. A measure often used in vector spaces, in which a norm can be defined, is, for instance, the sum of the squared differences between actual and expected values. By this way, with the determination of the mapping error in learning methods and learning devices trained in a supervised manner, the XOM mapping quality can be locally or globally determined. A special case is the use of a concatenation of mappings trained in a supervised manner, whereby source and target spaces of the concatenation are identical. Here, the deviation of source and target data objects after a forward and backward projection to and from a different data space can be observed and analyzed.

(g) Quality Assessment by Use of Interpolation, Extrapolation or Approximation, Forward and Backward Projection: Finally, the quality assessment in XOM can be performed by interpolation, extrapolation, or approximation of data objects of the ordering space in the exploration space or outcome space, or by interpolation, extrapolation, or approximation of data objects of the exploration space or outcome space in the ordering space, or by comparison of a data object of the ordering space or exploration space to its image, after forward and backward projection by use of suitable methods of interpolation, extrapolation, approximation, or supervised learning, according to the technical standard or to this patent application.

(h) Quality Assessment by Trajectories or "Blobs": It should be emphasized that in the presented and in other methods of the assessment of the XOM mapping quality, data objects can also be presented sequentially, e.g. data objects in the exploration space, whereby data objects presented consecutively over time have small mutual distances. The data presentation follows then "steady" trajectories in the respective data spaces, whereby proximity in time also implies proximity in space. A data presentation in form of "stimulation areas" moving through time and space, so-called "blobs", is also possible. Under suitable assumptions, e.g. steadiness assumptions, additional criteria for the XOM-quality-assessment can be developed, e.g. by consideration of the methods mentioned, which also take into account the time dynamics of the data presentation or are influenced by this.

3. Dimension Determination: With topology-preserving mappings, methods and devices for the local or global dimension determination of data distributions can be constructed, specifically also for data distributions with a fractal local or a fractal global dimension. The dimension determination is performed by mapping two data distributions to each other by means of topology-preserving mappings, whereby one distribution defines and influences the ordering space, the other the exploration space. By analysis of the characteristics of the topology-preserving mapping, for example in the sense of the methods and devices in 2, conclusions can be drawn about the dimensions of the distributions employed, e.g. in the sense of a dimension comparison. Such methods and devices are an independent aspect of the present invention and independent of the XOM definition. They can, however, also be interpreted with regard to the functional and structural definitions described in section 2.1, if one precisely applies the dimension of the "input data" introduced there. Here, the following cases must be distinguished:

(a) The dimension of the data distribution of the ordering space is to be determined, the dimension of the data distribution of the exploration space is known: The known dimension of the data distribution of the exploration space and the data distribution of the ordering space serve as input data in the sense of "something given, with which something should be done". By this way, the XOM definition is applicable.

(b) The dimension of the data distribution of the exploration space should be determined, the dimension of the data distribution of the ordering space is known: The dimension of the data distribution of the exploration space and the known data distribution of the ordering space serve as input data. The latter is thus an input object and the XOM definition is applicable.

(c) The dimensions of both data distributions are unknown, only a dimension comparison should be made: Both data distributions are thus input data, specifically also the data distribution of the ordering space. The XOM definition is, consequently, applicable.

For the dimension determination by means of topology-preserving mapping described above, in principle, any data distributions can be used. The following distributions can be listed here as specific reference distributions with known or calculable dimension: (i) the fractals, (ii) attractors of differential equations and differential equation-systems, in particular "chaotic" and "strange" attractors, such as Lorenz attractor, R"ossler attractor, Ueda-Duffing attractor, the attractor of the Mackey-Glass differential equation (differential-delay equation), etc., as well as (iii) attractors of iterative mappings, in particular "chaotic" and "strange" attractors, such as Sinai map, Circle map, Sine map, Shift map, Tent map, Logistic map, Henon map, Chirikov map, etc. Regarding (ii) and (iii) all attractors described in the literature in chaotic systems and non-linear dynamics can be used for the dimension determination by means of topology-preserving mappings. Specifically regarding (i), it should be emphasized that, in many cases, a special procedure is needed to perform a dimension determination by means of topology-preserving mappings. In this sense, the Hausdorff dimensions are often analytically calculated values referring to the ideal fractal objects. These, in general, comprise an infinite number of data points and, thus, cannot be simulated exactly in data processing devices. If one thus creates, for instance, self-similar point distributions, by use of recursive mapping rules over several recursion steps, then the result is often a data distribution with a very large number of data points. By reducing the number of recursion steps, the number of resulting data points becomes smaller, the resulting distribution, however, has other characteristics than the ideal fractal. Specifically, the Hausdorff dimension can differ considerably from the dimension of the ideal fractal. This is often caused by the fact that, over several recursion steps, the self-similarity substantially determines the fractal dimension. The trick is thus to first calculate the fractal over numerous recursion steps and then to make a random selection of the calculated data points. To experimentally determine the dimension of the resulting data distribution and to catch an eventual deviation from the theoretically predicted value, the determination of the correlation-dimension according to Grassberger-Procaccia is specifically suitable. Data distributions, the dimensions of which can be systematically "tuned" or adjusted, e.g. by modifying one or more parameters in a specific range, are specifically suitable for the dimension determination by means of topology-preserving mappings. As an example, fractal carpets, sponges, foams, nets, grids, or Koch Islands and Koch Lakes as well as the Mackey-Glass differential equation (differential-delay equation), for which the attractor dimension depends on the time delay. Some special cases of dimension determination by means of topology-preserving mappings should still be mentioned here:

(a) Dimension Determination in the Ordering Space: Determination of the dimension of the data distribution in the ordering space of a topology-preserving mapping, based on the methods and devices listed in item 1, specifically by use of the methods and devices listed in item 2, specifically by repeated application of the methods and devices listed in 1, with data distributions in the exploration space having known, eventually different dimensions.

(b) Dimension Determination in the Exploration Space: Determination of the dimension of the data distribution in the exploration space of a topology-preserving mapping, based on the methods and devices listed in item 1, specifically by use of the methods and devices listed in item 2, specifically by repeated application of the methods and devices listed in 1, with data distributions in the ordering space having known, eventually different dimensions.

(c) Dimension Comparison: Dimension comparison, based on the methods and devices listed in item 1, specifically also by means of exchange of the data distributions of the ordering and exploration space, i.e. reciprocal embedding, whereby the dimension of one or both distributions can be unknown, specifically by use of the methods and devices listed in item 2, specifically also by ordering of more than two data distributions with regard to their dimension by pairwise dimension comparison.

It is important for the dimension determination with XOM that all XOM modifications and evaluation techniques in this patent application, specifically those in 1 and 2 can be used.

4. Embedding: With XOM, effective methods and devices for non-linear embedding of data objects or their distributions in the ordering space into any data objects or their distributions in the exploration space can be realized, specifically in accordance with the description in item 1. Typically, here the ordering space of a topology-preserving mapping is constructed from the input data to be embedded. In the simplest case, the input data are used directly for this purpose. It is, however, possible to process the input data by some calculation rule, before entering them to the ordering space. It is also possible that the ordering space is not completely defined by input data. The data finally included in the ordering space are called original data. An arbitrarily chosen exploration space serves as embedding space, which is typically defined by structure hypotheses, but can also include, or be influenced, by input data. Embeddings with XOM can be useful for exploratory data analysis and/or visualization of the original data or for data reduction of the original data, in particular if the exploration space is chosen simpler and/or of lower dimension than the data space of the original data. It can, however, be helpful to choose the dimension of the exploration space higher than that of the ordering space, e.g. to perform dimension estimates or to observe convolution phenomena. For this, refer also to items 3 and 2. Essential aspects of embedding by XOM are:

(a) that, specifically, objects, distributions of data objects, or data spaces can also be embedded, for which any distance measures apply, i.e., in general, the distances between the data objects of these distributions can be defined by any distance measure, also by those that build no metric in a mathematical sense. Here, particularly refer to items 1e, 1f, and 1g. The embedding of any, in particular, also non-metrical data distributions, which define the topology of the ordering space of topology-preserving mappings with regard to any distance measures, is a central aspect of the invention. A very important special case is that of pairwise, eventually non-metrical, dissimilarities of data objects.

(b) that, specifically, data objects, distributions of data objects, or data spaces with fractal local or global dimension can also be embedded, refer to the explanations in item 3.

(c) that, specifically, data objects, distributions of data objects, or data spaces can also be embedded, which are completely or partially defined by distance objects, for which, for example, only pairwise distances, but no metrical embeddings are known, specifically for the calculation of metric embeddings.

(d) that, specifically, rescalings of distances in the ordering space, in the sense of 1, e.g. as Sparseness Annealing, as well as all XOM modifications described in this patent application and, in particular, in 1, can be employed.

(e) that the result of the embedding can be visualized and analyzed in a graphical display in form of an outcome or exploration plot, according to item 2d, specifically also for the purpose of non-linear principal component analysis or for the visualization of solutions of optimization problems, or for the visualization of data partitioning (clustering results).

(f) that the result of the embedding can be visualized and analyzed in a graphical display in form of an ordering plot, according to item 2e, specifically also for non-linear principal component analysis or for the visualization of solutions of optimization problems, or for the visualization of data partitioning (clustering results).

(g) that a quality assessment of the embedding results can be performed according to item 2. This can be used to improve structure hypotheses regarding the choice of suitable exploration spaces, in a goal-directed, eventually iterative way.

5. Data Partitioning, Clustering: With XOM, efficient methods and devices for hard or fuzzy partitioning or clustering of distributions of data objects can be constructed, specifically by taking into consideration the descriptions in item 1. In the following, an example of a typical procedure is illustrated:

(a) Specify the input data distribution as ordering space.

(b) Specify a suitable structure hypothesis for the exploration space. As an arbitrary example, here, a data distribution is mentioned that is composed of several Gaussian distributions, the parameters of which are determined ad-hoc. The centers of the Gaussian distributions can have any specified topological structure, for instance be ordered on a regular grid. Note that there are no restrictions to the choice of the data distributions in the exploration space, see, in particular, the items listed below.

(c) Train the topology-preserving mapping.

(d) Assign the codebook objects, in a hard or fuzzy way, to the individual data distributions of the exploration space, for instance by calculation and comparison of distances of each codebook object to the centers of the data distributions, which, in this case have been specified as Gaussian distributions. By definition of suitable distance measures, e.g. likelihood, this can also be performed in a fuzzy way, as well as in cases in which the outcome space and the exploration space are not identical.

Essential aspects of data partitioning or clustering by XOM are that (a) specifically, also data objects, distributions of data objects, and data spaces can be clustered, for which any distance measures apply, i.e. the distances between the data objects of these distributions can, in general, be defined by any distance measures, also by measures that do not form a metric in a mathematical sense. Here, refer specifically to items 1e, 1f, and 1g. The clustering of any, specifically also non-metric, data distributions, whereby these data distributions determine the topology of the ordering space of topology-preserving mappings in connection with any distance measures, is a central aspect of the invention. A very important special case is that of pairwise, eventually non-metric dissimilarities of data objects.

(b) specifically data objects, distributions of data objects, and data spaces with a fractal local or global dimension can be clustered. Here, refer also to the remarks in item 3.

(c) specifically, also data objects, distributions of data objects, and data spaces can be clustered, which are defined totally or partially by distance objects, i.e. for which for example only pairwise distances but no metric embedding are known, in particular for the purpose of clustering in metric embeddings.

(d) there are no restrictions to the choice of the data objects and distributions as well as their parameters in the exploration space.

(e) this can be performed, specifically, by training of the topology-preserving map ping with a natural number of identical, similar or different data distributions in the feature space, with different centers or medians.

(f) this can be performed, specifically, by hard or fuzzy assignment of single data objects to clusters, by use of a criterion which refers to the distance (e.g. minimal distance), in any distance measure, of the codebook object associated to the data object from the centers or other characteristic points (e.g. median) of the data distributions in the exploration space, e.g. the likelihood (e.g. maximum likelihood) of the positioning of the codebook object in the situation of a known structure of the data distribution in the exploration space or any other calculation rule based on the full or partial knowledge of the distribution functions in the exploration space.

(g) the choice of the data objects and distributions in the exploration space can comprise specifically: simple geometric objects (e.g. polygons, simple geometric bodies, line sections, circles, rings, spheres, etc.), any characteristic distributions, i.e. located uniform distributions, normal distributions, Laplace distributions, Poisson distributions, binomial distributions, hyper-geometric distributions, $\chi^2$ distributions, Student's t-distributions, Fisher F-distributions, Gamma distributions, Fisher Z-distributions, Kolmogorov-Smirnov λ-distributions, or single data objects in the sense of delta peaks.
- (h) the centers or other local parameters of the data distributions in the exploration space, e.g. the medians, can be ordered in a pairwise equidistant manner, e.g. on a discrete periodical grid.
- (i) specifically, a proper or improper subset of the weights, e.g. the number of data objects in each distribution or the scattering measures (momenta) or other parameters of the data distributions in the exploration space can be identical or similar.
- (j) specifically the centers of the data distributions in the exploration space with specification of n∈ℵ distributions, can lie at the corners of a regular simplex in the exploration space the dimension of which is at least n−1.
- (k) specifically number, structure, localization, dimension, relative or absolute weights or any other parameters of the data distributions in the exploration space can be variable over a training process or repeated training processes of the topology-preserving mapping, in particular that these can be varied in order to optimize a quality criterion according to items 2 or 6. Specifically, the scattering measures of the distributions can be chosen systematically variable over a training process or successive training processes, e.g. to facilitate an increasing focusing of the data objects to single clusters, i.e. to reduce the entropy of the distribution of the data objects to the clusters.
- (l) specifically also rescalings of the distances in the ordering space in the sense of 1r, e.g. as Sparseness Annealing, as well as all XOM modifications listed in this patent application, in particular in 1, can be employed.
- (m) the clustering results can be visualized and analyzed by graphical representation in form of an outcome or exploration plot as described in item 2d. Here, in particular, such representations are protected which characterize cluster boundaries or cluster tessilations, or which mark the affiliation of data objects to clusters by means of any graphical aids.
- (n) the clustering results can be visualized and analyzed by graphical representation in form of an ordering plot according to 2e. Here, in particular, such representations are protected which characterize cluster boundaries or cluster tessilations, or which mark the affiliation of data objects to clusters by means of any graphical aids.
- (o) a quality assessment of the clustering results can be made according to item 2. Thereby, specifically structure hypotheses with regard to suitable exploration spaces can be improved in a goal-directed and, eventually iterative way.
- (p) the clustering can be performed hierarchically, specifically with regard to item 1q, e.g. by dynamically and successively splitting distributions in the exploration space during a training process or over a series of training processes of the topology-preserving mapping.

6. Cluster Validity: The term cluster validity describes the problem of defining appropriate structure hypotheses for the data distributions to be clustered and/or evaluating the quality of given partitionings of data regarding these structure hypotheses, specifically regarding the number and/or relative weight of the clusters, the selection of initialization strategies and/or the selection of the employed clustering method.

An essential independent aspect of the invention is that, in contrast to the technical standard, methods for the determination of the cluster validity on dissimilarity data are proposed. Such a method can be technically described as follows:

Data processing method for the determination of the cluster validity, in which data objects are entered, distance objects are entered and/or calculated, as well as an assignment of the data objects to be processed to groups is entered and/or calculated, in particular according to methods described in this patent application, where a measure of the quality of this assignment is delivered as output, whereby the measure of the quality of the assignment is calculated using at least a part of the entered and/or calculated distance objects. For the term "distance object" the definition above applies. It should be once more stressed that particularly such distance measures are included in this definition that do not define any metric in a mathematical sense.

As a concrete realization of such methods, two procedures are proposed:

First, cluster validity measures can be developed for dissimilarity data that are based on cost functions employed in methods for the clustering of dissimilarity data.

Methods and devices for the determination of cluster validity can be developed, for example, by calculating second differences of the cost functions used for the clustering of dissimilarity data, such as second differences of the cost functions depending on the currently used number of clusters. Relative or absolute maximum values of the magnitude of these second differences can be used as cluster validity criterion.

Second, efficient methods and devices for the assessment of cluster validity can be constructed by XOM with respect to the hard and fuzzy partitioning or for the clustering of distributions of data objects, specifically in accordance to the descriptions in item 1, 5, and 2.

An example of the typical procedure for the determination of cluster validity by XOM is described in the following:
- (a) Define a cluster validity criterion, e.g. according to 2.
- (b) Perform a clustering according to 5.
- (c) Analyze the clustering results by comparison with respect to this criterion.
- (d) Modify the structure hypotheses for the clustering, i.e. the data distributions in the exploration space chosen for the clustering. Repeat the clustering and the analysis regarding the criterion, eventually several times, e.g. with respect to optimization of the clustering results with regard to the criterion.

Simple and important examples of cluster validity criteria are the measures for the analysis of the distortion, of the topology- and distribution-preservation described in 2, as well as measures obtained from distance plots or quality assessments by supervised learning.

Essential aspects of the cluster validity analysis by XOM are
- (a) that it can be, specifically, performed for non-metric data distributions as well. It can be performed for any data objects, distributions of data objects, or data spaces, specifically for those that can be clustered by XOM. The remarks in item 5 concerning this, are fully applicable.
- (b) that it can be performed, in particular, based on all methods and devices in item 2.
- (c) that it can also be used to evaluate the quality of a given data partitioning, i.e. of one that has not been obtained by XOM clustering.
- (d) that a visualization of such analyses can be performed by means of exploration, outcome, and ordering plots in the sense of 2. Here, in particular, also a visualization of a known or calculated data partitioning is possible, for instance by visualization of the assignment of data objects to clusters. Additionally, a graphic representation of the cluster validity measures depending on the structure hypotheses or on their parameters is possible. Typically, cluster validity measures can be represented depending, for instance, on the number of given clusters.

(e) that in case of repetitive application of such analyses not only the number of clusters, but any structure hypotheses, can be modified, in particular schemes of hierarchical clustering, refer to item 5, can be applied.

7. Supervised Learning: By XOM, methods and devices for supervised learning can be constructed, specifically for the approximation or interpolation of functions, for time series analysis or time series prediction, for smoothing or filtering. In the supervised learning, a learning method or a learning device is trained by use of pairs of data objects. A pair includes one or more source data objects as well as one or more target data objects. The source data objects are taken here from a source space, the target data objects from a target space. In a so-called test or working phase, after the training has been completed or is in an advanced stage, if new source data objects, without the corresponding target data objects, are entered, an estimation of the assigned target data objects can be obtained by using the trained mapping. Typical supervised learning methods are for example different neural networks (e.g. Multilayer Perceptrons, Radial Basis Functions-Networks, Support Vector Machines as well as numerous variations of these methods), local models, as local average models or local linear models, as well as all approximation or interpolation methods described in the literature.

Supervised learning by XOM can be implemented by use of all aspects described in this patent application, e.g. using the description in 1 as well as in combination with the use of interpolation or approximation methods according to the technical standard.

Realization possibilities and essential aspects of supervised learning by XOM are (a) that, with XOM, this can be performed, in particular, by splitting of the ordering space into source and target space. Typically, the ordering space is defined here as the product space of the source and target space. Then, a representative hyper-manifold of the data distribution is constructed within this product space, according to 14, using XOM. In the working phase, if the hyper-manifold is known, it is possible to determine a target data object from a given source data object by completing the coordinates of the point corresponding to the source data object of the hyper-manifold in the target space. This method can be used, for example, for function approximation or function interpolation.

(b) that this can, in particular, be implemented by means of methods and devices according to item 1o, for example for the approximation or interpolation of functions.

(c) that this can be implemented, in particular, by use of methods and devices for XOM clustering according to item 5. Typically, the XOM clustering results are used here as an additional input for methods and devices for supervised learning according to the technical standard. A very important special case is the use of XOM clustering results as input for the training of radial basis functions-networks, according to item 21a.

(d) that this can be used, in particular, for the supervised learning on metric or non-metric dissimilarity data, for instance for the purpose of classification of such data. Here, for example, XOM clustering according to 5 can be performed on, eventually non-metric, dissimilarity data. The clustering results could then be entered, for example, into the training of a radial basis functions-network, e.g. in the sense of 21a.

(e) particularly in combination with the use of interpolation and approximation methods according to the technical standard or the other claims.

8. Registration: By XOM it is possible to realize methods and devices for the registration of datasets, considering all items of this patent application, particularly item 1 as well as combinations of XOM with methods and devices according to the technical standard. Specifically, a non-linear, non-affine, locally distorting registration of data sets can be realized.

The simplest case is typically based on two data distributions. The so-called "test data set" is to be registered on a "reference data set". This is often similar the test data set according to criteria to be defined suitably. Typically, test and reference data sets are given, both are thus input data in the sense of "something given, with which something should be made". In the simplest case, one of the data sets is used to define the ordering space of a topology-preserving mapping, while the other one is used to define its exploration space. In any case, input data are used to partially or completely define the ordering space. Therefore, the XOM definition is applicable.

After completed training of the topology-preserving mapping, the quality of the registration result can be evaluated, specifically by means of the methods and devices in item 2.

Essential aspects of the registration by XOM are (a) that it can be employed specifically for the registration of, eventually multispectral, image data sets in 2D and 3D, as well as of image series.

(b) that it can be used specifically for the registration of time series or time functions, for example in the sense of a Dynamic Time Warping (DTW).

(c) that it can be used specifically as pre-processing for any further data processing tasks, e.g. classification or clustering, in the sense of a "normalization". Here, different data sets, e.g. image data sets, are registered to a given standard data set. If, for example, a classification problem, or any other problem, was already fully or partially successfully solved on the standard data set, this solution can be adopted for the other data sets after the registration. An arbitrary example of this is the segmentation of certain regions in image data sets of the brain by registration of image data sets from different individuals to a previously segmented "standard brain" used as a standard data set.

(d) that by this, specifically measures for the local or global similarity between different data sets can be obtained, particularly by use of the methods and devices according to item 2.

(e) that before registration, a data reduction in the sense of a vector quantization can also be performed.

(f) that boundary conditions or other additional constraints for the registration can be enforced by so-called "topology anchors". These are additional data objects added to the data sets to be registered. This is, in general, performed the case (i) in the regions of the data sets which should be as well adjusted as possible by the registration, (ii) similarly in the data sets to be registered. These topology anchors are usually chosen in a way that in case of their incongruent registration one would expect high costs in the sense of mapping quality measures, e.g. according to the criteria mentioned in 2.

9. Active Learning: By XOM it is possible to realize methods and devices for so-called "active learning", by reference to all items of this patent application, specifically item 1, as well as in combination of XOM with methods and devices according to the technical standard. By this, a procedure is understood, in which, during the training process of a learning procedure, the selection of data objects out of the training data set for the further training is directedly influenced by the current status of the learning procedure, by use of suitable calculation methods.

A typical example of the realization of active learning by XOM is a situation where the selection of data objects out of the exploration space during the training process of the topology-preserving mapping is influenced by the current status of the topology-preserving mapping, by use of suitable calculation methods, e.g. by the achieved global or local mapping quality, e.g. calculated by using the methods and devices as described in item 2.

10. Molecular Dynamics Simulation: By XOM it is possible to realize methods and devices for the so-called "molecular dynamics simulation", by use of all items of this patent application, specifically item 1, as well as in combination of XOM with methods and devices according to the technical standard. By this, calculations of the spatial and temporal structure of molecules of fully or partially known composition as well as the use of knowledge gained from these calculations are understood. Important examples are the analysis of the secondary or tertiary structure of proteins or the analysis of the functional spatio-temporal structure of active centers of enzymes. An essential invention in this context is that for the molecular dynamics simulation "rigid", i.e. that can be only changed by a relevant amount by strong external influences, spatial relations or constraints between the atoms of a molecule or its surroundings are used to define the topology of the ordering space of a topology-preserving mapping. Typical examples of such rigid spatial relations are link lengths and link angles in covalent links between atoms of a molecule. In the simplest case, each atom or group of atoms is assigned to a data object of the ordering space as well as to a codebook object.

By training of the topology-preserving mapping with XOM, interactions between atoms or the surroundings can be modeled, whereby the analysis of the outcome space yields the searched structure of the molecule. Examples of procedures for such modeling are:

(a) Modeling of the interaction by codebook-specific variation of the learning rule of the topology-preserving mapping, for instance in the sense of item 1m. A simple example could be the modeling of the learning parameter .epsilon. in a self-organizing map, in dependence of the strength of the interaction, according to equation (9). In analogy, a modeling can be thought of, where the interaction between two atoms is not considered at every learning step but less often, depending on the strength of the interaction. In this way, also different degrees of "rigidity" can be modeled regarding the spatial constraints mentioned above.

(b) Iterative use of XOM, e.g. according to is. This can be combined, in particular, with a procedure where the XOM molecular dynamics simulation is divided into small simulation steps, whereby in each simulation step only small changes in the spatio-temporal molecular structure are modeled. At the end of a simulation step, the outcome space is used as the new ordering space of the topology-preserving mapping and the simulation is continued. At this point, the original constraints in the topology of the ordering space can be restored that were no longer represented in an adequate manner in comparison to the topology of the ordering space, in the context of topology violations in the outcome space, during the previous simulation step. Topology violations regarding the constraints can thus be corrected. At the same time, new topological relations between the atoms that can be derived from the result of the previous simulation step, can be taken into consideration for the modeling of the new ordering space. Specifically, procedures can be thought of, where a continuous correction of local topology violations is performed, e.g. regarding the criteria mentioned in 2.

11. Robotics: In analogy to item 10, problem solutions can be achieved in robotics, in particular in the field of inverse kinematics.

In analogy to the procedure in the molecular dynamics simulation, "rigid", i.e. that can only be changed by a relevant amount by strong external influences, spatial relations or constraints between the components of a robot or between the robot and its surroundings are used to define the topology of the ordering space of a topology-preserving mapping. Typical examples of such rigid spatial relations are the form and size of components of a robot or constraints regarding the relative mobility of its components against each other. In the simplest case, a data object of the ordering space as well as a codebook object is assigned to characteristic points of components or a localized group of components. characteristic points of All remarks in item 10 are then applicable in a completely analogous way.

12. Sorting: With XOM it is possible to realize methods and devices for the sorting of data objects, e.g. as described in item 1. Here, the intended ordering of the data objects is represented by the topology of the ordering space. This can be performed, in particular, in situations, where only a proper subset of the possible pairwise ordering relations between the data objects is known or calculable, or should be used for the sorting.

13. Optimization: By XOM it is possible to realize methods and devices for finding solutions to optimization problems, by use of all items of this patent application, specifically item 1 as well as in combination with methods according to the technical standard.

Important aspects regarding the use of XOM for finding solutions to optimization problems are that:

(a) this is, in particular, possible as well, if only a proper subset of the calculable pairwise distances between the data objects is used as input data.

(b) this is, in particular, possible as well, if the pairwise distances between data objects do not form a metric.

(c) this can be, specifically, also used for finding solutions of NP-hard optimization problems, e.g. of metric or particularly non-metric Traveling Salesman Problems or similar mathematical problems. In the Traveling Salesman Problem, for instance, the position of the cities can determine the topology of the ordering space, a ring-shaped uniform distribution can represent the exploration space. The visualization of the solution can be given as an exploration plot as well as, specifically, as an ordering plot according to 2. 14. Construction of Hyper-Manifolds: With XOM, methods and devices for the construction of approximating hyper-manifolds and for non-linear principal component analysis can be implemented, applying all items of this patent application, specifically item 1 as well as in combination of XOM with methods and devices according to the technical standard.

Important aspects regarding the use of XOM for the construction of approximating hyper-manifolds and for the non-linear principal component analysis are that:

(a) this can be done specifically by the calculation of supporting points of the hyper-manifolds by using local, eventually weighted, averaging, interpolation, or approximation in the ordering space or outcome space after completed XOM embedding, refer also to item 4. The XOM embedding for the non-linear principal component analysis is made possible, for instance, by the calculation of a path through the data objects of the ordering space based on an embedding in a 1D-manifold in the exploration space.

(b) here, specifically, also the size or structure of the local areas chosen in this context can be variable, e.g. by use of methods and devices according to item 2, for example, in order to allow a local adjustment of the representation quality of the hyper-manifold.

(c) specifically, the dimension or structure of the training data set in the exploration space can also be locally or globally variable during a training process, or over a series of training processes. It can, for instance, be dynamically adjusted by use of criteria for the determination of the global or local topology preservation or dimension estimation, according to items 2 or 3.

(d) specifically, the hypothetically assumed dimension or structure of the representing hyper-manifolds in the ordering space, or the ordering space itself, can be locally or globally variable during a training process or over a series of training processes. It can for instance be dynamically adjusted by use of criteria for the determination of the global or local topology preservation or dimension estimation, for instance according to items 2 or 3.

(e) specifically, also in the sense of evolutionary computing algorithms, structure hypotheses about data distributions in the exploration space or representing hyper-manifolds in the ordering space can be created, dynamically modified and/or optimized, specifically by methods and devices according to 14c or 14d, whereby single structure hypotheses can also be seen as individuals. Here, specifically, also mutations can be influenced by use of criteria for the determination of the global or local topology preservation or dimension estimation, for instance according to items 2 (here, in particular, also item 2h) or 3.

(f) the visualization of the generated hyper-manifolds can be performed directly in the ordering space or indirectly by their embedding in the exploration space or outcome space. The visualization is thus possible by means of exploration, outcome, and ordering plots in the sense of item 2. Hereby specifically, also the visualization of the local mapping quality on these hyper-manifolds or their embeddings, according to item 2, can be performed by color or other optical coding. 15. Interpolation, Extrapolation, Approximation: By XOM it is possible to implement methods and devices for the interpolation, extrapolation, or approximation of data distributions by use of all items of this patent application, specifically of item 1 as well as in combination of XOM with methods and devices according to the technical standard.

Important aspects regarding interpolation, extrapolation, or approximation with XOM are that (a) this can be performed, specifically, by use of methods and devices according to item 11.

(b) this is, specifically, possible as well, if the interpolation, extrapolation, or approximation should be performed for additionally entered data objects, after partial or complete training of the topology-preserving mapping.

(c) these can be performed, specifically, by use of methods and devices according to item 14.

(d) specifically, the data distributions in the exploration, outcome, or ordering space of topology-preserving mappings trained in the sense of XOM can be processed by use of methods and devices according to the technical standard, e.g. neural networks, local models or any other methods for the interpolation, extrapolation, or approximation.

16. Self-Organization: By XOM, methods and devices for the self-organization and morphogenesis of objects, structures and systems of any kind, specifically technical systems, can be realized which own abilities like self-regeneration, self-reproduction, or decentralized information storage. This can be performed by use of all items of this patent application, specifically item 1, here, in particular, it as well as in combination of XOM with methods and devices according to the technical standard.

17. Relevance Learning: With XOM, methods and devices for the determination of the relevance of data objects or components of data objects for tasks of the data processing and data analysis can be realized by determination of task-specific target criteria, by use of all items of this patent application, specifically item 1 as well as in combination of XOM with methods and devices according to the technical standard. This can be performed, for instance, by scaling of the single dimensions when using vectorial input data, by selection of specific data objects from the training data set for the training of the topology-preserving mapping, e.g. for supervised learning tasks, clustering, or the construction of representing hyper-manifolds.

18. Visualization and Layout of Graphs: By XOM, methods and devices for the visualization and for layout of graphs can be implemented, by use of all items of this patent application, specifically item 1 as well as in combination of XOM with methods and devices according to the technical standard.

XOM can be used for the layout and visualization of graphs, specifically, (a) if more than one data distribution in the exploration space is used for the training.

(b) if it is not a uniform data distribution in the exploration space which is used for the training.

(c) if the data objects or subsets thereof in the ordering space do not satisfy any metric in a mathematical sense.

(d) if the data distributions in the exploration space used for the training are not convex.

(e) if the data objects or subsets thereof in the ordering space or in the exploration space do not satisfy the Euclidian geometry or if their distance is defined by any dissimilarity measures.

(f) if distances of any data objects are used for the training, also if these are not connected by an edge, e.g. by use of geodesic distances or a rank metric.

(g) if the topology-preserving mapping does not correspond to the sequential formulation of a self-organizing map according to Kohonen.

(h) if the distribution of the training data used for the training of the topology-preserving mapping in the exploration space has a dimension other than 2 or 3.

(i) if the distribution used for the training of the topology-preserving mapping is not a sphere in 3D.

(j) if the training rule of the topology-preserving mapping for the codebook objects assigned to the nodes can be different for different nodes or codebook objects. For this, also refer to item 1m.

(k) if not all connections for which the mutual distances are known or have been calculated are used for the visualization of the graph.

19. Applications: By XOM, methods and devices for applications in the fields of circuit design, bio-informatics, robotics, meteorology, image processing, technical self-organizing and self-repairing systems, text mining, flight security, traffic control and maintenance systems, coding, encrypting, security technology can be constructed. This can be performed by use of all items of this patent application, in particular item 1, here specifically It as well as in combination of XOM with methods and devices according to the technical standard.

20. Combinations: The methods and devices listed in the single items above can be combined in numerous ways. In this context, the following should be specifically emphasized:
    (a) Combination of dimension determination and embedding
    (b) Combination of embedding and determination of approximating hyper-manifolds
    (c) Combination of clustering and cluster validity analysis
    (d) Combination of embedding and clustering. Here, the embedding can be used for dimension or data reduction.

21. Combination with Methods and Devices According to the Technical Standard The methods and devices listed in the single items above can also be used in combination with methods and devices according to the technical standard. The following should be specifically emphasized:
    (a) Combination of XOM clustering with methods and devices for supervised learning, specifically for the creation of networks in the sense of radial basis functions-networks with or without normalization of the basis functions. Here, any distance measure between the codebook objects and the localization parameters (e.g. center, median) of the prototypical distributions of the exploration space used for XOM clustering can be used for the definition of the basis functions, e.g. the likelihood of the positioning of the codebook objects regarding the prototypical distributions.
    (b) Combination of XOM embedding with methods and devices for interpolation or approximation.

22. Visualization: Numerous methods and devices can be employed for the visualization of input data, structure hypotheses, and calculation results in XOM. The following should be specifically stressed here:
    (a) the visualization of the codebook objects in the outcome or exploration space or their movement in the sense of an outcome plot, refer to item 2
    (b) the visualization of the training data distributions in the exploration space in the sense of an exploration plot, refer to item 2
    (c) the visualization of the data objects of the exploration or outcome space in the ordering space in the sense of an ordering plot, refer to item 2
    (d) the visualization of the mapping quality in a distance plot or quantities derived from that, refer to item 2
    (e) color coding or other graphical marking of the local topology violation or other local criteria for the mapping quality according to item 2 in the exploration, outcome, ordering, or distance plot.

23. Mutual Connectivity Analysis: In the following, methods and devices are described, which allow an innovative kind of data processing based on dissimilarity data. The underlying method will be denominated in the following "Mutual Connectivity Analysis" (MCA). XOM represents an important method for the data analysis in connection to MCA, see below.

First, an example of a typical technical procedure is presented for illustration. It should be stressed that this procedure is not restricted to the kinds of data and calculation methods mentioned in this example.

The starting point is a set of N time series $Z=\{z_1, \ldots, z_N\}$, e.g. in form of a set of data vectors in $R^M$, $M \in \aleph$, whereby each data vector $z_n$, $n=1, \ldots, N$ represents one time series and each element $Z_{nt}$ of the vector $z_n$ the value of the time series at time t, with $t \in \{1, \ldots, M\}$.

For each time series a "sliding window" with the length $2p+1$, $p \in \aleph$, $p<M$ is then defined, which groups together $2p+1$ chronologically neighboring values of the time series, with $t-p \leq t > t+p$, or $2p+1$ successive elements of the data vectors representing the time series, whereby p is chosen equal for all time series. (For the beginning and for the end of the time series heuristic conventions are made on how to define the sliding window there.) The portions cut from the time series $z_n$ in this way, or the vectors cut from the data vectors representing the time series are in the following denoted as "window" $x_n(t)$.

Now, two time series $z_r$ and $z_s$ are selected.

For all windows of these two time series a distance $d(x_r(t), x_s(t))$ is then determined, for instance by use of a supervised learning method. This can be done by determination of the prediction error for each t, with which $x_s(t)$ can be predicted from $x_r(t)$ after completion of the training of the supervised learning method. The supervised learning method can be trained, for example, with a subset of all pairs $(x_r(t), x_s(t))$. For this, the set of these pairs can be split into training, test, and/or validation data sets, as is general convention for the application of supervised learning methods. Obviously, it can make sense, depending on the task, to determine instead of $d(x_r(t), x_s(t))$ also $d(x_r(t), x_s(t+\tau))$ with a suitable time offset $\tau$.

By using a suitable calculation method, a distance $D_{rs}=D(x_r, x_s)$ between the time series $z_r$ and $z_s$ is calculated for the pairs $(x_r(t), x_s(t))$ selected as test data set from the calculated $d(x_r(t), x_s(t))$. An obvious calculation method for this is, for example, to compute the average of the $d(x_r(t), x_s(t))$ for all t observed in the test data set in the sense of a mean prediction error. Note that, in general, $D._{rs} \neq D_{sr}$ applies.

The procedure can thus be repeated for all $N^2$ pairs of time series, for example.

The resulting distance matrix of the distances between every two time series can now be further processed in any way, specifically by methods of data partitioning on dissimilarity data, e.g. pairwise clustering according to the technical standard, or according to this patent application, e.g. according to item 5 or by methods for the classification on dissimilarity data, e.g. according to item 7d.

For the calculation of the mutual distances of time series, it is possible to achieve a considerable speed advantage by using calculation rules that split this distance calculation into two steps, whereby one step has to be performed only once for each time series and the other one for every pair of time series.

This can be illustrated in the example above: The prediction of a time series $z_s$ from another time series Zr can be done, for example, by training of a radial basis functions-network: here, first, the windows of the time series Zr are processed by vector quantization. From this, prototypical time series windows result that can be called codebook vectors according to the introductory remarks about vector quantization in section 1.1. It is essential that the vector quantization has to be performed only once for each time series. The codebook vectors are then used for the supervised training of the output layer of a radial basis functions-network, where the windows of the time series $z_s$ serve as target values for the supervised training. The training of the output layer of the radial basis functions-network must be repeated for every time series $z_s$ to be predicted form the time series $z_r$, i.e. a total of $N^2$ times if all pairs of time series are taken into account.

So, the vector quantization has to be performed N times, the training of the output layer of the radial basis functions-network $N^2$ times, if all pairs of time series are taken into account. In general, the computational expense for the vector quantization is considerably higher than for the supervised training of the output layer of the radial basis function-network, which, therefore, results in a considerable speed advantage for the entire procedure.

In analogy, it is possible to use local models, e.g. local average models or local linear models instead of radial basis functions-networks. The following procedure can then be used for the prediction of a time series $z_s$ from another time series $z_r$: First, determine the k nearest neighbors of each window of the time series $z_r$ among the other windows of this time series. This step only has to be carried out once for each time series $z_r$. In a second step, these k nearest neighbors of the time series windows are interpolated or approximated, for each time series to be predicted, according to the calculation rule of the respective local model, whereby the windows of the time series $z_s$ are used as target values for the supervised training. The interpolation or approximation for the k nearest neighbors of the time series windows in the calculation rule of the local model must be repeated for every time series $z_s$ to be predicted from the time series $z_r$, i.e. $N^2$ times, if all pairs of time series are taken into account. The search of the k nearest neighbors of the time series windows must thus be performed N times, the interpolation or approximation of the k nearest neighbors of the time series windows $N^2$ times, if all pairs of time series are taken into account. In general, the computational expense is considerably higher for the search of the k nearest neighbors of the time series windows than for the interpolation or approximation according to the calculation rule of the local model, which, again, results in a considerable speed advantage for the entire process.

First, for illustration, an example of a typical technical procedure should be presented.

It should be stressed that the concept of the MCA is not limited to the data types and calculation rules for the analysis of time series mentioned in this example. Rather, the example above motivates the following technical procedure.

First, some terms should be defined:

Data Objects are data without any limitation, e.g. sets, numbers, vectors, graphs, symbols, texts, images, signals, mathematical mappings and their representations, e.g. matrices, tensors, etc. as well as any combination of data objects.

Sub Data Objects are data objects that do not contain the complete information of the data objects, i.e. the original data object, in general, cannot be fully calculated from the knowledge of a sub data object.

Distance Objects are data objects that characterize similarity relations or distances between data objects, according to any distance metric. Here, distance measures induced by metrics as well as, specifically, similarity relations or dissimilarities defined by any distance measures that are eventually not determined by a metric, are included.

Sub Distance Objects are distance objects between sub data objects, specifically those of different data objects.

For reasons of clarity, it should be mentioned that the following correspondences could be chosen with regard to the example above: Data object corresponds to time series. Sub data object corresponds to window. Sub distance object corresponds to distance between time series windows of different time series.

Technical procedure, MCA:

A set of data objects is given. Specifically, the set of data objects can also contain exact copies of the data objects.

Enter the set of data objects into the data processing method or device.

Divide the data objects into sub data objects. The division does not have to be disjoint nor complete.

Calculate distance objects between sub data objects of the entered set of data objects. These distance objects are called sub distance objects.

Calculate, by use of the sub distance objects, new distance objects that represent the distances between the data objects of the entered set of data objects.

Deliver the distance objects computed from this.

It is essential that the calculation of the distance objects between the sub data objects or data objects can be performed by means of any methods for interpolation, extrapolation, and/or approximation. In particular, among these methods are:

(i) Statistical Learning Methods of any kind, specifically those requiring supervised learning, particularly neural networks and Support Vector Machines, Bayes networks, Hidden Markov Models, Observable Operator Models. Among the neural networks, the following should be specifically mentioned: Multilayer-Perception in all variants described in the literature, specifically those with training by error-back-propagation, radial basis functions-networks in all variants described in the literature, specifically also generalized radial basis functions-networks, ART networks, Local Linear Mappings (LLM) in all variants described in the literature, as well as other neural networks allowing supervised learning, such as topology-preserving mappings, self-organizing maps as well as XOM.

(ii) Local Models of any kind: local average models (also with weighting), local linear models, local models with additional topological constraints, specifically adaptive local models with parameters depending on the respective learning success achieved.

(iii) Methods of Inferential Statistics, specifically if test statistics or levels of significance of statistical tests are used as distance measures.

(iv) Special Calculation Methods, such as Levenstein distance, Mutual Information, Kullback-Leibler Divergence, coherence measures employed in signal processing, specifically for biosignals, LPC cepstral distance, distance measures that compare the power spectra of two signals, as for instance the ItakuraSaito distance, the Mahalanobis-Distance, distance measures regarding the phase synchronization of oscillators.

One variant of this procedure should be specifically mentioned. For reasons of clarity, it should be mentioned that with regard to the example above for the analysis of a set of time series the following correspondences could be chosen: An auxiliary data object corresponds, for instance, to a codebook vector in the vector quantization of the time series windows of a time series in the prediction of time series by use of radial basis functions-networks. Alternatively, an auxiliary data object corresponds, for instance, to a set of k nearest neighbors of a time series window in the time series prediction by use of local models.

Variant of the technical process flow, MCA:

A set of data objects is given. Specifically, the set of data objects can also contain exact copies of the data objects.

Enter the set of data objects into the data processing method or device.

Divide the data objects into sub data objects. The division does not have to be disjoint nor complete.

Calculate new data objects for the sub data objects of single data objects, the so-called auxiliary data objects.

Calculate, by use of auxiliary data objects, distance objects between sub data objects of the entered set of data objects. These distance objects are called sub distance objects.

Calculate, by use of sub distance objects, new distance objects that characterize the distances between the data objects of the entered set of data objects.

Deliver the distance objects computed from this.

Specifically, only the sub data objects of one single entered data object and/or more than one sub data object can be used for the calculation of an auxiliary data object.

In the following, the output distance objects can be analyzed. For this, methods and devices according to the technical standard and/or to the descriptions in this patent application are suitable. In this context, the following should be specifically mentioned: methods and devices for clustering and/or for supervised learning, in particular for pairwise clustering of dissimilarity data, methods and devices for XOM clustering according to item 5, as well as for supervised learning, e.g. classification on dissimilarity data, methods and devices for supervised learning on dissimilarity data by XOM according to item 7d.

As application examples should be mentioned: data processing, e.g. clustering, of financial time series, such as stock prices, processing of data, e.g. time series, from the fields of economy, finance, medicine, natural sciences and/or technology, specifically ordered data objects, e.g. time series of laboratory values or other measurements of biomedical or meteorological research methods, e.g. biomedical images, gene expression-profiles, gene- or amino acid sequences.

For the time series example above it is clear that the definitions of data types and calculation methods made there do not imply any restrictions with regard to the general technical procedures. Specifically, any data objects, e.g. ordered data objects such as images or gene sequences, can be used instead of time series. In the analysis of time series, the values of the time series do not have to be measured equidistantly; it is not necessary to use sliding windows or supervised learning methods for the analysis of the output data, etc.

The invention claimed is:

1. A system for generating codebook objects for an artificial neural network from input data comprising:
    a processor;
    a memory coupled to the processor;
    computer code loaded into the memory for executing on the processor, for implementing the following functionality:
    (a) providing data objects to be processed as input data and providing data objects of exploration space;
    (b) generating a topology-preserving mapping, by:
        (i) ordering neurons in ordering space, according to a given pattern;
        (ii) assigning codebook objects in outcome space to the neurons;
        (iii) processing codebook objects according to the calculation rule of a topology-preserving mapping, by use of data objects of the exploration space; and
        (iv) outputting the processed codebook objects as output data;
    (c) determining the order of neurons in the ordering space by using at least a part of the provided data objects, and
    (d) providing data objects of the exploration space which are independent of the input data.

2. The system of claim 1, wherein the data objects to be processed are distance objects.

3. The system of claim 1, wherein data objects in the ordering space are ordered irregularly.

4. The system of claim 1, wherein data objects of at least one of the ordering space, exploration space, and outcome space are used which comply with at least one of the following conditions:
    (A) they satisfy a non-Euclidian geometry;
    (B) they are distance objects to data objects of a local neighborhood of data objects;
    (C) they represent data distributions with a fractal dimension;
    (D) they represent data distributions of non-orientable surfaces in the sense of differential geometry;
    (E) they are added, omitted or modified during the training processes or a series of training processes of the topology-preserving mapping, in particular for distance objects in the ordering space;
    (F) they are influenced by additional constraints;
    (G) they are saved or processed in local units; and
    (H) they are added, omitted or modified after completion of the training of the topology-preserving mapping.

5. The system of claim 1, wherein at least one of the calculation rule of the topology-preserving mapping and at least one parameter of this calculation rule:
    is chosen depending on the respective processed data object of at least one of the ordering space, exploration space and outcome space;
    is modified during the training process or over several training processes of the topology-preserving mapping, in particular depending on the respective processed data object of at least one of the ordering space, exploration space, and outcome space; and
    is influenced by additional constraints.

6. A computer implemented system for determining the cluster validity of an artificial neural network comprising a computer processor coupled to a memory, the memory containing computer code for performing the following steps:
    (a) storing data objects as input data;
    (b) storing distance objects between these data objects;
    (c) assigning the data objects to be processed to groups by:
        (i) processing the data objects by using a topology-preserving mapping, by:
            (1) ordering neurons in ordering space, according to a given pattern;
            (2) assigning codebook objects in outcome space to the neurons;
            (3) processing codebook objects according to the calculation rule of a topology-preserving mapping, by use of data objects of the exploration;
            (4) outputting the processed codebook objects as output data;
        (ii) both of the following substeps (1) and (2):
            (1) determining the order of neurons in the ordering space by using at least a part of the provided data objects;
            (2) providing said data objects that are independent of the input data to be processed and which are used as data objects of the exploration space;
    (d) outputting a measure of the quality of this assignment as output data; and
    (e) calculating the measure of the quality of the assignment by employing at least a part of the provided distance objects.

7. The system of claim 6 wherein step (e) comprises the steps of:
    (f) providing data objects to be processed as input data;
    (g) processing provided data objects by using a topology-preserving mapping; and (h) applying a cost function of a method for the clustering of dissimilarity data, wherein the measure of the quality of the assignment is calculated by using at least one set of the set of substeps (h)(i) and h(ii) and the set of substeps (h)(iii)-(h)(vi) and a cost function of a method for the clustering of dissimilarity data:
  (i) processing provided dissimilarity data objects by using a topology-preserving mapping, by:
    (1) ordering neurons in ordering space, according to a given pattern;
    (2) assigning codebook objects in outcome space to the neurons;
    (3) processing codebook objects according to the calculation rule of a topology-preserving mapping, by use of data objects of the exploration;
    (4) outputting the processed codebook objects as output data;
  (ii) at least one of the following substeps (1) and (2):
    (1) determining the order of neurons in the ordering space by using at least a part of the provided dissimilarity data objects; and
    (2) providing said dissimilarity data objects that are independent of the input data to be processed and which are used as data objects of the exploration space; and
  (iii) providing dissimilarity data objects to be processed;
  (iv) calculating distances between the dissimilarity data objects to be processed as distance objects;
  (v) outputting these distance objects as output data;
  (vi) calculating the distances by use of at least one of statistical learning methods, local models, methods of inferential statistics, and one of the following specific computation methods:
    (A) Levenstein Measure;
    (B) Mutual Information;
    (C) Kullback-Leibler Divergence;
    (D) coherence measures employed in signal processing, in particular for biosignals;
    (E) LPC cepstral distance;
    (F) calculation methods that relate the power spectra of two signals, such as the Itakura-Saito Distance;
    (G) the Mahalanobis-Distance; and
    (H) calculation methods relating to the phase-synchronization of oscillators.

8. The system of claim 6, in which the computer code executes said steps repeatedly, wherein the output data of a previous run is stored as input data of a subsequent run.

9. The system of claim 6, comprising the step of:
  (f) determining the quality of the output data and outputting this determined quality.

10. The system of claim 9 wherein the quality is determined by at least one of:
  (A) calculating measures for topology-preservation or distribution-preservation;
  (B) calculating distortion measures;
  (C) relating the distances of data objects in the ordering space to the distances of corresponding data objects in at least one of the outcome space and the exploration space, in particular by plotting these data objects in a distance plot;
  (D) graphically displaying data objects of at least one of the exploration space, the outcome space and the ordering space, in particular by applying these data objects to at least one of an exploration, outcome and ordering plot;
  (E) graphically displaying data objects calculated from data objects of at least one of the exploration space, outcome space and ordering space, in particular by plotting these object data in at least one of an exploration plot, outcome plot and ordering plot;
  (F) calculating and outputting the mapping error for at least one of an interpolation, extrapolation, approximation and supervised learning, in particular by forward and backward projection; and
  (G) sequential processing of data objects.

11. The system of claim 1 wherein step (d) comprises the step of:
  (e) generating the data objects of the exploration space according to a structural hypothesis.

12. The system of claim 6 wherein step (c)(ii)(2) comprises the step of:
  (e) generating the data objects of the exploration space according to a structural hypothesis.

* * * * *